(12) United States Patent
Guruswamy et al.

(10) Patent No.: US 8,463,860 B1
(45) Date of Patent: Jun. 11, 2013

(54) SCENARIO BASED SCALE TESTING

(75) Inventors: Kowsik Guruswamy, Sunnyvale, CA (US); Dmitrijs F. Sapovalovs, Menlo Park, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 202 days.

(21) Appl. No.: 13/118,155

(22) Filed: May 27, 2011

Related U.S. Application Data

(63) Continuation-in-part of application No. 13/101,728, filed on May 5, 2011.

(60) Provisional application No. 61/331,758, filed on May 5, 2010.

(51) Int. Cl.
*G06F 15/173* (2006.01)

(52) U.S. Cl.
USPC ............ 709/206; 709/203; 709/220; 707/602

(58) Field of Classification Search
USPC . 709/203, 220, 206; 455/67.11, 405; 707/602
See application file for complete search history.

(56) References Cited

U.S. PATENT DOCUMENTS

| | | | |
|---|---|---|---|
| 5,067,104 A | 11/1991 | Krishnakumar et al. | |
| 5,459,837 A | 10/1995 | Caccavale | |
| 5,485,409 A | 1/1996 | Gupta et al. | |
| 5,892,903 A | 4/1999 | Klaus | |
| 6,088,804 A | 7/2000 | Hill et al. | |
| 6,324,656 B1 | 11/2001 | Gleichauf et al. | |
| 6,363,477 B1 | 3/2002 | Fletcher et al. | |
| 6,574,737 B1 | 6/2003 | Kingsford et al. | |
| 6,584,569 B2 | 6/2003 | Reshef et al. | |
| 6,609,205 B1 | 8/2003 | Bernhard et al. | |
| 6,654,914 B1 | 11/2003 | Kaffine et al. | |
| 6,952,779 B1 | 10/2005 | Cohen et al. | |
| 7,152,105 B2 | 12/2006 | McClure et al. | |
| 7,159,151 B2 | 1/2007 | Morgan et al. | |
| 7,178,166 B1 | 2/2007 | Taylor et al. | |
| 7,185,232 B1 | 2/2007 | Leavy et al. | |
| 7,200,676 B2 * | 4/2007 | Christensen et al. ......... 709/238 |
| 7,243,148 B2 | 7/2007 | Keir et al. | |
| 7,257,630 B2 | 8/2007 | Cole et al. | |
| 7,272,650 B2 | 9/2007 | Elgebaly et al. | |
| 7,290,145 B2 | 10/2007 | Falkenthros | |

(Continued)

FOREIGN PATENT DOCUMENTS

WO 2006/099536 9/2006

OTHER PUBLICATIONS

U.S. Appl. No. 11/696,605, filed Apr. 4, 2007.
U.S. Appl. No. 13/153,797, filed Jun. 6, 2011.

(Continued)

*Primary Examiner* — Khanh Dinh
(74) *Attorney, Agent, or Firm* — Haynes Beffel & Wolfeld LLP; Ernest J. Beffel, Jr.

(57) ABSTRACT

Various example embodiments are directed to scale testing based on scenarios. A computer system may receive a scenario, which may comprise a plurality of scenario objects including, a first host, a second host, a plurality of transports, a plurality of variables and a plurality of steps. The computer system may also receive a pattern. The scenario may be processed to generate a processed scenario. The computer system may execute a first track including executing a plurality of concurrencies of the processed scenario according to the pattern.

28 Claims, 12 Drawing Sheets

U.S. PATENT DOCUMENTS

| | | | |
|---|---|---|---|
| 7,315,801 B1 | 1/2008 | Dowd et al. | |
| 7,342,892 B2 | 3/2008 | Soon et al. | |
| 7,346,922 B2 | 3/2008 | Miliefsky | |
| 7,421,621 B1 | 9/2008 | Zambrana | |
| 7,447,966 B2 | 11/2008 | Kamannavar et al. | |
| 7,451,488 B2 | 11/2008 | Cooper et al. | |
| 7,471,999 B2 | 12/2008 | Taki | |
| 7,478,018 B1* | 1/2009 | Lavallee et al. | 703/2 |
| 7,509,675 B2 | 3/2009 | Aaron | |
| 7,512,125 B2 | 3/2009 | Betts et al. | |
| 7,536,456 B2 | 5/2009 | Williams et al. | |
| 7,536,605 B2 | 5/2009 | Keaffaber et al. | |
| 7,543,056 B2 | 6/2009 | McClure et al. | |
| 7,607,170 B2 | 10/2009 | Chesla | |
| 7,624,422 B2 | 11/2009 | Williams et al. | |
| 7,627,891 B2 | 12/2009 | Williams et al. | |
| 7,627,900 B1 | 12/2009 | Noel et al. | |
| 7,664,845 B2 | 2/2010 | Kurtz et al. | |
| 7,673,043 B2 | 3/2010 | Keir et al. | |
| 7,774,637 B1 | 8/2010 | Beddoe et al. | |
| 7,954,161 B1 | 5/2011 | Guruswamy et al. | |
| 7,958,230 B2 | 6/2011 | Guruswamy et al. | |
| 7,958,560 B1 | 6/2011 | Guruswamy | |
| 2001/0034847 A1 | 10/2001 | Gaul, Jr. | |
| 2002/0157041 A1 | 10/2002 | Bennett et al. | |
| 2003/0051163 A1 | 3/2003 | Bidaud | |
| 2003/0154399 A1 | 8/2003 | Zuk et al. | |
| 2003/0159063 A1 | 8/2003 | Apfelbaum et al. | |
| 2004/0001443 A1 | 1/2004 | Soon et al. | |
| 2004/0068586 A1 | 4/2004 | Xie et al. | |
| 2004/0068675 A1 | 4/2004 | Liu | |
| 2004/0103315 A1 | 5/2004 | Cooper et al. | |
| 2004/0205557 A1 | 10/2004 | Bahrs et al. | |
| 2004/0230881 A1 | 11/2004 | Gwak | |
| 2004/0249950 A1* | 12/2004 | Christensen et al. | 709/227 |
| 2005/0015213 A1 | 1/2005 | Somervill et al. | |
| 2005/0044418 A1 | 2/2005 | Miliefsky | |
| 2005/0135391 A1 | 6/2005 | Sung | |
| 2005/0144137 A1 | 6/2005 | Kumar et al. | |
| 2005/0195820 A1 | 9/2005 | Betts et al. | |
| 2005/0248457 A1 | 11/2005 | Himberger et al. | |
| 2005/0273772 A1 | 12/2005 | Matsakis et al. | |
| 2005/0273854 A1 | 12/2005 | Chess et al. | |
| 2005/0273859 A1 | 12/2005 | Chess et al. | |
| 2006/0005231 A1 | 1/2006 | Zuk et al. | |
| 2006/0015941 A1 | 1/2006 | McKenna | |
| 2006/0015943 A1 | 1/2006 | Mahieu | |
| 2006/0021034 A1 | 1/2006 | Cook | |
| 2006/0021044 A1 | 1/2006 | Cook | |
| 2006/0021045 A1 | 1/2006 | Cook | |
| 2006/0021046 A1 | 1/2006 | Cook | |
| 2006/0021047 A1 | 1/2006 | Cook | |
| 2006/0021048 A1 | 1/2006 | Cook et al. | |
| 2006/0021049 A1 | 1/2006 | Cook | |
| 2006/0036755 A1 | 2/2006 | Abdullah et al. | |
| 2006/0080733 A1 | 4/2006 | Khosmood et al. | |
| 2006/0085723 A1 | 4/2006 | Bartz et al. | |
| 2006/0098579 A1 | 5/2006 | Chang et al. | |
| 2006/0106939 A1 | 5/2006 | Cha et al. | |
| 2006/0137009 A1 | 6/2006 | Chesla | |
| 2006/0277606 A1 | 12/2006 | Yunus et al. | |
| 2007/0006037 A1 | 1/2007 | Sargusingh et al. | |
| 2007/0011319 A1 | 1/2007 | McClure et al. | |
| 2007/0086389 A1 | 4/2007 | Park et al. | |
| 2007/0094728 A1 | 4/2007 | Julisch et al. | |
| 2007/0115962 A1 | 5/2007 | Mammoliti et al. | |
| 2007/0174917 A1 | 7/2007 | Guruswamy | |
| 2007/0204347 A1 | 8/2007 | Caceres et al. | |
| 2008/0005555 A1 | 1/2008 | Lotem et al. | |
| 2008/0072322 A1 | 3/2008 | Guruswamy | |
| 2008/0092237 A1 | 4/2008 | Yoon et al. | |
| 2008/0098479 A1 | 4/2008 | O'Rourke et al. | |
| 2008/0120283 A1 | 5/2008 | Liu et al. | |
| 2008/0155338 A1 | 6/2008 | Rusmanov | |
| 2008/0282352 A1 | 11/2008 | Beddoe et al. | |
| 2009/0083854 A1 | 3/2009 | Bozanich et al. | |
| 2009/0271863 A1 | 10/2009 | Govindavajhala et al. | |
| 2009/0320137 A1 | 12/2009 | White et al. | |
| 2009/0328190 A1 | 12/2009 | Liu et al. | |
| 2010/0106742 A1 | 4/2010 | Guruswamy et al. | |
| 2010/0284282 A1 | 11/2010 | Golic | |
| 2010/0284283 A1 | 11/2010 | Golic et al. | |
| 2010/0293415 A1 | 11/2010 | Beddoe et al. | |
| 2012/0191641 A1* | 7/2012 | Crupi et al. | 707/602 |

OTHER PUBLICATIONS

U.S. Appl. No. 13/095,807, filed Apr. 27, 2011.
U.S. Appl. No. 13/101,728, filed May 5, 2011.
U.S. Appl. No. 13/154,636, filed Jun. 7, 2011.
U.S. Appl. No. 12/982,381, filed Dec. 30, 2010.
U.S. Appl. No. 11/760,600, filed Jun. 8, 2007.
U.S. Appl. No. 12/234,450, filed Jun. 8, 2007.
U.S. Appl. No. 11/850,164, filed Sep. 5, 2007.
Wagner, D. et al., "Intrusion Detection Via Static Analysis", IEEE Symposium on Security and Privacy, 2001, pp. 156-168.
Finlay, I. et al., "Multiple Vulnerabilities in Many Implementations of the Simple Network Management Protocol (SNMP)", CERT® Advisory CA-2002-03, Pittsburgh, PA, US.
Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.
Kaksonen, R., "A Functional Method for Assessing Protocol Implementation Security", VTT Publications 448, 2011, 128 p.+app. 15p., Technical Research Centre of Finland, FI.
Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.
Miller, B. et al., "Fuzz Revisited: A Re-examination of the Reliabiltiy of Unix Utilities and Services", Computer Sciences Department, Oct. 1995, pp. 1-23, Madison, Wisconsin, US.
Protos Test-Suite: c06-snmpvl, University of Oulu (ee.oulu.fi)—http://www.ee.oulu.fi/research/ouspg/protos/testing/c06/snmpv1/index, Oct. 17, 2002, pp. 1-26, Finland.
Protos Test-Suite: c06-ldapv3, University of Oulu (ee.oulu.fi)—http://www.ee.oulu.fi/research/ouspg/protos/testing/c06/ldapv3/index.html, Dec. 2001, pp. 1-13, Finland.
Beddoe, M., "Network Protocol Analysis using Bioinformatics Algorithms", 2004, retrieved on May 17, 2007, from <URL: http://www.4tphi.net/~awalters/PI/pi.pdf>.
Case, J. et al., "A Simple Network Management Protocol (SNMP)" (RFC 1157), May 1990, retrieved on May 17, 2007, from <URL: http://www.faqs.org/rfcs/rfc1157.html>.
Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.
McCloghrie K. et al., "Structure of Management Information Version 2 (SMIv2)" (RFC 2578), Apr. 1999, retrieved on May 17, 2007, from <URL: http://www.faqs.org/rfcs/rfc2578.html>.
Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL: http://arxiv.org/abs/cs/9709102>.
Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL: http://post.queensu.ca/~trd/research/papers/FinalPST04.pdf>.
Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL: http://post.queensu.ca/~trd/research/papers/MILCOM.pdf>.

Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.queensu.ca/~trd/research/papers/zhangState.pdf>.

Zhang, S. et al., "Applying Software Transformation Techniques to Security Testing", Proceedings: Software Technology and Engineering in Practice (STEP), Toronto, Canada, Oct. 2005, retrieved on May 17, 2007, from <URL: http://post.queensu.ca/~trd/research/papers/step2005.pdf>.

Aitel, D., "An Introduction to Spike, the Fuzzer Creation Kit" (presentation slides), Aug. 1, 2002, Black Hat USA, Las Vegas, NV, online, retrieved Jun. 26, 2007, from <URL: https://www.blackhat.com/presentations/bh-usa-02/bh-us-02-aitel-spike.ppt>.

Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.

Beddoe, M., "The Protocol Informatics Project: Automating Network Protocol Analysis" (presentation slides), 2005.

Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.

Beizer, B., "Chapter 9: Syntax Testing", in Software Testing Techniques, 2nd Ed., 1990, pp. 284-319, Van Nostrand Reinhold, New York, NY.

Beizer, B., "Chapter 8: Syntax Testing", in Black-Box Testing: Techniques for Functional Testing of Software and Systems, 1995, pp. 177-201, John Wiley & Sons, Inc., New York, NY.

Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness>.

Mu Security, "6 Degrees of Protocols", 2006.

Mu Security, "Protocol Vulnerability Patterns", Apr. 2006.

Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.

Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntax%20Testing.ppt>.

Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.

Bellovin, S. "A Technique for Counting NATted Hosts", Proceedings: Second Internet Measurement Workshop (IMW), Marseille, France, Nov. 6-8, 2002, pp. 267-272.

Bradner, S. et al., "Benchmarking Methodology for Network Interconnect Devices (RFC_1944)", May 1996, online, retrieved on May 12, 2006, from <URL: http://rfc.net/rfc1944.html>.

Bradner, S. et al., Benchmarking Methodology for Network Interconnect Devices (RFC$_{13}$ 2544), Mar. 1999, online, retrieved on May 12, 2006, from <URL: http://rfc.net/rfc2544.html>.

Cisco Systems, Inc., "Mobile IP—NAT Detect" in "Cisco IOS IP Mobility Configuration Guide, Release 12.4.", 2005, online, retrieved on May 12, 2006, from <URL: http://www.cisco.com/univercd/cc/td/doc/product/software/ios124/124cg/himo_c/ch05/hnatray.pdf>.

Dunn, J. et. al., "Methodology for ATM Benchmarking (RFC 3116)", Jun. 2011, online, retrieved on May 12, 2006, from <URL: http://rfc.net/rfc3116.html>.

Egevang, K., et al., "The IP Network Address Translator (NAT) (RFC 1631)", May 1994, online, retrieved on May 12, 2006, from <URL: http://rfc.net/rfc3116.html>.

Microsoft Corp., "Overview of Network Address Translation (NAT) in Windows XP", Sep. 12, 2005, online, retrieved on May 12, 2006, from <URL: http://www.microsoft.com/technet/prodtechnol/winxppro/deploy/nattrnsw.mspx?pd=true>.

Netcom Systems, "SmartWindow User Guide Version 6 53", Document No. 340-1020-001 REV C, Dec. 1999, online, retrieved on May 12, 2006, from <URL: https://www.cobra.ee.ntu.edu.tw/~oops/HTML6/08_exp/smartbit%20reading.pdf>.

Nikolic, M., "Performance Measurements of Multimedia Transmissions in IP over ATM Networks", Master's Thesis, School of Engineering Science, Simon Fraser University, Dec. 2002, online, retrieved on May 12, 2006, from <URL: http://142.58.111.30/~Ijilja/cnl/pdf/milan.pdf>.

Sorensen, S., "Intrusion Detection and Prevention Protecting Your Network from Attacks", Document No. 200065-002, 2006, online, retrieved on May 12, 2006, from <URL: http://www.juniper.net/solutions/literature/white_papers/200065.pdf>.

Srisuresh, P. et al., "IP Network Address Translator (NAT) Terminology and Considerations (RFC 2663)", Aug. 1999, online, retrieved on May 12, 2006, from <URL: http://rfc/net/rfc2663.html>.

Srisuresh, P. et al., "Traditional IP Network Address Translator (Traditional NAT) (RFC 3022)", Jan. 2001, online, retrieved on May 12, 2006, from <URL: http://rfc.net/rfc3022.html>.

Trend Communications, "RFC 2544 Testing with Aurora Tango", date unknown, online, retrieved on May 12, 2006, from <URL: http://www.trendtest.co.uk/trendweb/resource.nsf/vIFileURL-Lookup/en%5E%5ERFC+2544+testing/$FILE/GbEnet.2544.test.pdf>.

Udupa, R. et al., "Performance Issues and Evaluation Techniques for Networking Devices", 2001, online, retrieved on May 12, 2006, from URL: http://softwaredioxide.com/Channels/events/testing2001/Presentations/raghavendra_infosys.pdf>.

PCT International Search Report and Written Opinion, PCT/US06/09512, Aug. 31, 2006.

Wikipedia.com, Active Directory, http://en.wikipedia.org/wiki/Tunneling_protocol.

Wikipedia.com, Active Directory, http://en.wikipedia.org/wiki/Session_initiation.

Gordano.com, What is the SMTP/EHLO clause.

U.S. Appl. No. 11/514,809, filed Sep. 1, 2006.

U.S. Appl. No. 11/859,691, filed Sep. 21, 2007.

U.S. Appl. No. 11/351,402, filed Feb. 10, 2006.

* cited by examiner

US 8,463,860 B1

SCENARIO BASED SCALE TESTING

This application is a continuation-in-part of co-pending U.S. patent application Ser. No. 13/101,728, filed on May 5, 2011, the entire contents of which are incorporated herein by reference thereto, and which claims priority to U.S. Provisional Application 61/331,758, filed May 5, 2010, the entire contents of which are also incorporated herein by reference thereto.

BACKGROUND

This application generally relates to implementing scale testing of a device or devices under test based on one or more scenarios. The scenarios may be based on captured communications between one or more hosts.

Many computer hardware and/or software products (referred to herein as devices) are designed to operate at high interaction volumes. For example, many devices are expected to perform as intended while handling of high numbers of users, high numbers of active connections, high incoming/outgoing bandwidth use, etc. Scale or volume testing methods seek to model and apply high interaction volume conditions to a device under test. For example, such methods typically involve presenting high levels of concurrent users, connections, bandwidth, etc. to the device under test and subsequently monitoring the device under test. Existing methods, however, lack efficiency, limiting the achievable interaction volume.

DESCRIPTION

Figure 1:
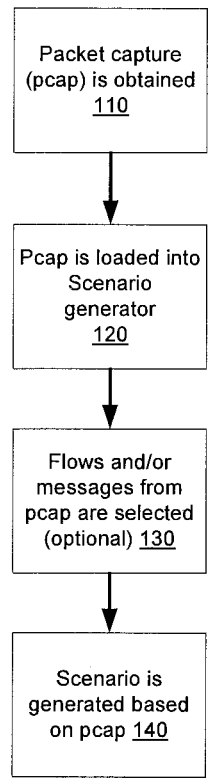
FIG. 1 is a flowchart of an example method for using a scenario generator, according to one example embodiment of the invention.

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to example embodiments of the invention by way of illustration only. Alternative example embodiments of the structures and methods disclosed here may be employed without departing from the principles of what is claimed.

Various example embodiments are directed to systems and methods for scale testing a device under test utilizing a scenario. The scenario may describe a communication between at least one host (e.g., one or more message flows). For example, the scenario may be between a first host (e.g., a client) and a second host (e.g., a server). Some communications may be between more than two hosts. For example, a client web browser may request a web page that is served by multiple server hosts. Also, for example, peer-to-peer protocol transactions may involve multiple hosts. The scenario may comprise objects including, for example, at least one host, at least one transport object utilized for the communication, at least one variable and/or option describing a potential variation in the communication, one or more steps for the communication, etc. The scenario may be processed for the scale test, resulting in a processed scenario that may, in some example embodiments, be partially or completely immutable. The processing may include, for example, parsing and optimization. The parsing may comprise, for example, tallying and indexing the objects making up the scenario. This may simplify later optimization and/or serialization of the scenario (e.g., by requiring fewer processor cycles). The parsing may also comprise, for example, converting the scenario to an abstract syntax tree.

Optimizing may include various processing performed on the scenario to optimize it for scale testing. For example, the optimizing may comprise identifying and removing unused variables from the scenario. This may reduce the amount of memory necessary to load the scenario at run time, thus increasing the efficiency of executing the scenario. Also, for example, optimizing may comprise in-lining simple fields of the scenario. For example, fields of the scenario that will not change during scale testing may be expressed as a byte array rather than as separate nodes. In this way, serialization of the scenario may be accomplished with fewer processor cycles. In various example embodiments, optimizing may also comprise identifying static sub-trees of the scenario (e.g., expressed as the abstract syntax tree). Static sub-trees may be replaced by one or more byte arrays. Similarly, contiguous static sub-trees may be identified and replaced by one or more byte arrays. This may also simplify serialization.

Various forms of payload optimization may also be performed. For example, the total number of fields in the scenario (e.g., expressed as an abstract syntax tree) may be computed and the fields may be indexed. This may simplify the serialization process at run time, reducing the necessary processor cycles. Additionally, in some example embodiments, the last step for each transport utilized by the scenario may be identified. This may allow transports to be closed upon completion during execution of the scenario. Subsequent to processing (e.g., parsing and optimization), the processed scenario, in various example embodiments, may be partially and/or totally immutable.

The processed (e.g., immutable) scenario may be expressed as a part of a track for scale testing. The track may also comprise a pattern and a dataset. The pattern may define one or more intervals. Each interval may represent a period of time. The pattern may also comprise, for each interval, a start number of concurrencies and an end number of concurrencies. Each concurrency may correspond to one instance of the scenario being executed. At the beginning of each interval, the start number of concurrencies may be executed. The number of concurrencies being executed may be modified (e.g., increased and/or decreased) to the end number by the end of the interval. The slope of the increase or decrease in the number of concurrencies being executed over an interval may have any suitable value and, in various example embodiments, may be constant. In various example embodiments, the start and end conditions for an interval may be expressed as a desired number of connections to a device under test and/or a desired bandwidth of connections to the device under test. The number of concurrencies required to achieve the desired number of connections and/or bandwidth may be determined, for example, prior to and/or at run time. In various example embodiments, the track may also comprise a dataset. The dataset may comprise a set of pre-computed values for the variable and/or option objects of the scenario. For example, values included in the dataset may be calculated prior to run time, and subsequently used at run time in lieu of calculating random values on the fly. This may reduce the hardware resources (e.g., processor cycles) necessary to execute the track.

According to various example embodiments, executing a track may comprise executing one or more concurrencies of the scenario according to the pattern. Execution of a track may be managed by one or more runtimes. For example, a single runtime may handle the execution of each track, or of multiple tracks. In various example embodiments, each computer system (computer, server, etc.) may execute a single runtime, which may manage the execution of all tracks executed by the hardware component. Also, in some example embodiments, multiple runtimes may be executed on a single computer system. For example, each runtime may be managed by a different user, allowing the user to administer one or more tracks running on the computer system.

According to various example embodiments, execution of the tracks by one or more computer hardware devices (e.g., servers or other computer equipment) may be managed by a scheduling functionality referred to herein as a scheduler. The scheduler may manage the resources of the computer system and/or an operating system executed by the computer system. For example, a runtime managing the execution of a track and/or a concurrency of a track may execute a step of a scenario having a first action to be executed after a second action is executed by a component other than the runtime (e.g., a send step to be completed after certain data is received). When the runtime is ready to execute the first action (e.g., after completion of a step or steps prior to the step comprising the first action), the runtime may register with the scheduler. According to various example embodiments, the runtime may cease execution after registering. Upon execution of the second action by the other component, the scheduler may re-call the runtime, at which point it may execute the first action.

Also, according to various example embodiments, the scheduler may be programmed to determine a required memory allocation for the concurrencies executing on the computer system at a given time. If the required memory allocation for the concurrences exceeds a threshold, the concurrencies may be prioritized. Based on the prioritization, at least one step of one of the concurrencies may be suspended. In some example embodiments, the scheduler may also monitor a resource level of an operating system of the computer system. If the resource level of the operating system drops below a threshold, the scheduler may suspend execution of one or more of the concurrencies, for example, based upon the prioritization of concurrencies. Upon completion of the non-suspended concurrencies, the scheduler may select at least one of the suspended concurrencies to re-activate.

According to various example embodiments, executing a track may also comprise assigning received messages to a track and/or a concurrency of the track. For example, a received message may be assigned to a first step from a concurrency of a scenario based on a source address of the incoming message, a port associated with the incoming message, a session ID variable identifying the concurrency, etc.

Reference will now be made in detail to several example embodiments, examples of which are illustrated in the accompanying figures. Wherever practicable similar or like reference numbers may be used in the figures and may indicate similar or like functionality. The figures depict example embodiments of the disclosed systems (or methods) for purposes of illustration only. One skilled in the art will readily recognize from the following description that alternative example embodiments of the structures and methods illustrated herein may be employed without departing from the principles described herein.

A "scenario" may be a set of information that represents (models) one particular message exchange, which may be a single or multi-protocol exchange. A message may be, for example, a network packet, although a message may also include multiple packets. In one example embodiment, a scenario includes the following types of information: protocols, transports/services, hosts (message senders and receivers that participate in the scenario message exchange), message flows (incoming and outgoing), message structures and values, message order, field hierarchy within messages, steps, assertions, and variables.

A scenario may be used as the basis for scale testing. For example, a scenario may be processed and coupled with a pattern and/or a dataset to form a track. Executing the track may comprise executing multiple concurrencies of the processed scenario, for example, as described herein. Multiple hosts may be supported, so a scenario may involve a message exchange between multiple hosts in a network. For example, a conference call over Voice over Internet Protocol (VoIP) might include multiple phones all registering and transferring information to a single server. A business process transaction can involve authentication servers, billing servers, and purchase order processing servers.

One way to automatically generate tracks based on a scenario is to use the Mu Studio software application from Mu Dynamics of Sunnyvale, Calif. The Mu Studio application can also be used to view and/or edit the information within a scenario in a graphical user interface (GUI) format. This GUI format may include a list of all packet content (packet list or flow list) and a call graph (highlights message exchange between individual hosts). Scenario editing or customization can include changing values of fields, adding options and/or variables, adding padding, creating relationships between fields (e.g., checksums), and constructing assertions designed to verify expected activity. The Mu Studio application can also be used to verify a scenario against a target device or application.

A scenario can be expressed in different formats, such as XML or a scripting language, such as a human-readable scripting language. Appendix A includes an example XML schema (adhering to the XML Schema Definition (XSD) format) for an object that represents a scenario in the Mu Scenario Template language (filename extension .mus).

Appendix B includes a description of the Mu Scenario Template language defined by the schema in Appendix A. Appendix C includes a sample Mu Scenario Template language file. Appendix D includes a sample scripting language file (written in Mu Scenario Language or "MuSL"; filename extension .msl) that corresponds to the same scenario that is described by the XML file in Appendix C. Appendices A, B, C, and D form part of this disclosure. If a scenario is expressed using plain-text (e.g., using the Mu Scenario Template language or MuSL), then a person can create a scenario by typing into a text editor.

It will be appreciated that using a platform-independent language, such as the examples shown in the appendices, may provide several advantages. With a standardized language, scenarios may be portable from the device used to create the scenario to a device that may later be used to play the scenario as a test.

The scenarios themselves, expressed in a standardized format, may be independent of the playback engine that is used to play them for testing. Thus, scenarios can be used as the input for generating and playing large numbers of concurrencies for scale testing.

Scenarios expressed in a standard language may also be used as the input for other types of tests such as functional tests and mutation tests by sending them to playback engines optimized for these types of testing, such as those also available from Mu Dynamics, the assignee of the present application. For example, a scenario may be used for automated test (e.g., mutation test) creation. Example embodiments utilizing scenarios to create and execute test cases are provided in commonly owned U.S. patent application Ser. No. 13/101,728 titled, "Generating Communication Protocol Test Cases Based On Network Traffic," filed on May 5, 2011, the disclosure of which is incorporated herein by reference in its entirety. Examples for generating test cases using protocol mutation are described in commonly owned U.S. patent application Ser. No. 11/351,309, titled "Portable Program for Generating Attacks on Communication Protocols", filed Feb. 10, 2006, and U.S. patent application Ser. No. 11/351,403, titled "Platform for analyzing the security of communication protocols and channels", also Feb. 10, 2006, the disclosures of which are incorporated herein by reference in their entireties.

Scenarios may also be independent of a particular display device or display interface. Accordingly, scenarios may serve as the input for several types of display formats depicting different aspects of the scenario that may be of interest to a user.

In one example embodiment, a scenario may be generated automatically based on a message exchange that actually occurred and that represents valid behavior. The message exchange can be, for example, a packet capture ("pcap") of network traffic. Since a pcap contains actual network traffic, it reflects a particular network environment, including situations specific to that particular network, such as internal or proprietary protocols, custom extensions for well-known protocols, complex protocol interactions (e.g., protocol nesting), implemented bug fixes for known issues, etc. And since the pcap is used to generate a scenario, the scenario can also reflect these network-specific situations. Scale tests generated based on the scenario may also reflect these network-specific situations, thereby testing a customer's own unique protocol implementation (as opposed to a generic protocol specification). The scale tests thus created may be representative of what one might expect in his or her real network.

In one example embodiment, a scenario is generated based on an actual message exchange of specific traffic. This traffic is typically caused by normal usage of clients and servers (e.g., a user navigating to a Web server using a Web browser).

Packet captures can be generated by various software applications such as network traffic analyzers or packet sniffers (e.g., the Packet Recorder feature of Mu Studio or Wireshark from the Wireshark Foundation). These software applications generally use the libpcap library (UNIX-based systems) or the WinPcap library (Windows-based systems). The libpcap library saves a pcap to a file using the libpcap savefile format (.pcap), which is described on the pcap-savefile man (manual) page. Appendix E includes a sample pcap file according to the .pcap format. (Since the .pcap format is binary, some portions of the file are not alphanumeric characters and thus are unreadable.) Appendix E forms part of this disclosure.

A packet capture can be thought of as a conversation between a set of participants. Using that analogy, a host is a participant, and a flow is a specific conversation between two participants. These conversations happen on top of a set of well-known protocols (e.g., Ethernet, IP, TCP, UDP, or SCTP). The well-known protocol is the "transport." The transport is the medium over which the conversation happens. In one example embodiment, each of these protocols is represented internally by objects that are configured to initiate/respond and communicate using that particular protocol.

In real-world terms, two people could have a conversation over a phone or via email, where phone is the medium and email is the medium, respectively. Over email, two participants could have more than one conversation occurring simultaneously (based on, e.g., the subject line). Similarly, with higher level transports like TCP and UDP, two participants could have multiple conversations with each other at the same time (based on, e.g., different port number).

A unicast conversation is one-to-one. Each unicast conversation has an initiator (the source or client) and another participant to whom the initiator is talking (the destination or server). A multicast/broadcast conversation is one-to-many and is similar to walking into a room of people and saying "Hello" to no one in particular. A multicast/broadcast conversation can be either a query broadcast to find a particular respondent (in which case it is often a precursor to a one-to-one conversation with whomever responds) or a broadcast to update listeners about some change (which would be similar to a host making an announcement in the middle of an event). Each conversation is made up of one or more packets sent by the source to the destination and vice-versa. In one example embodiment, each such packet is represented internally by two steps—as being sent by one side and as being received by the other side.

A "scenario generator" generates a scenario based on actual network traffic, for example by using a packet capture ("pcap") of network traffic. FIG. 1 is a flowchart of an example method for using a scenario generator, according to one example embodiment of the invention. In 110, a pcap (e.g., a .pcap file) is obtained. For example, a message exchange is performed, and a network traffic analyzer or packet sniffer is used to generate a pcap of the message exchange. Alternatively, a pcap is obtained from a third party (e.g., from a packet capture repository such as pcapr.net). Another option is to use a pcap provided by the scenario generator.

In 120, the pcap is loaded into the scenario generator. For example, the address of the pcap is provided to the scenario generator, and the scenario generator accesses the pcap at that address. The address can be a local address (e.g., a directory path on a local machine) or a network address (e.g., a device name or IP address and a directory path on that device).

In 130, one or more flows and/or messages (e.g., packets) are selected from the pcap. When a pcap is loaded, the scenario generator automatically identifies the packets, message flows, services, and individual hosts that appear in the pcap. In one example embodiment, the scenario generator then displays that information in a flow selector tool. The flow selector tool presents either flow content or packet content. One or more filters may be used to narrow the list of flows or packets by selecting specific services or hosts. The content list may update accordingly to enable the user to see the flows or packets controlled by each filter. The flows or packets in the narrowed list will be used to generate the scenario in 140. If no filters are used, then all of the flows or packets in the pcap will be used to generate the scenario in box 140.

By default, the flow selector tool displays content as a list of flows in ascending order by timestamp. If the pcap does not contain flows or if the user wants to work with packets instead, the flow selector tool can display content as a list of packets. In one example embodiment, the flow selector tool is the Flow Selector feature of Mu Studio.

Box 130 is optional. If 130 is not performed, then all of the flows or packets in the pcap will be used to generate the scenario in 140.

In 140, a scenario may be generated based on the pcap. If 130 was performed and one or more filters was used to narrow the list of flows or packets, then the scenario will be generated based on the flows or packets in the narrowed list. If 130 was not performed (or if 130 was performed and no filters were used), then the scenario will be generated based on all of the flows or packets in the pcap.

Figure 2:
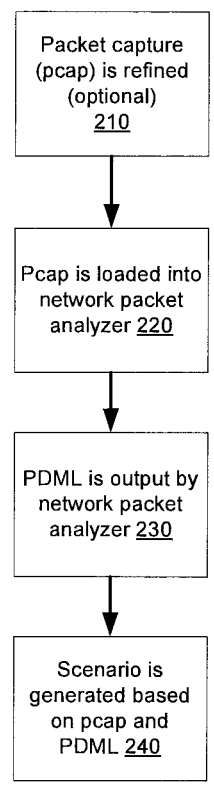
FIG. 2 is a flowchart of an example method for generating a scenario based on a packet capture, according to one example embodiment of the invention.

FIG. 2 is a flowchart of an example method for generating a scenario based on a packet capture, according to one example embodiment of the invention. FIG. 2 provides more detail regarding 140 of FIG. 1. In 210, a pcap is refined. This pcap may either be the flows or packets in the narrowed list (if filters were used) or all of the flows or packets in the pcap, as described above. Box 210 cleans up the pcap and writes the modified pcap to a new pcap file. The refined pcap will be loaded into a network packet analyzer in 220.

Box 210 is optional. If 210 is not performed, then the original (unrefined) pcap will be loaded into the network packet analyzer in 220.

In 220, the pcap may be loaded into the network packet analyzer (e.g., Wireshark). If 210 was performed, then a refined pcap will be loaded into the network packet analyzer. If 210 was not performed, then an original (unrefined) pcap will be loaded into the network packet analyzer.

In 230, information adhering to the Packet Details Markup Language (PDML) is output by the network packet analyzer. PDML is a language designed to describe information related to a decoded packet and was developed by the NetGroup at Politecnico di Torino (Italy). PDML is related to Network Protocols Description Language (NetPDL), which describes protocols from OSI layer 2 to OSI layer 7. Specifically, PDML was originally designed to be used by a NetPDL engine to create a detailed view of each packet.

In PDML, a detailed view of a packet is an XML file that contains the most important information related to protocols and fields that are contained in that packet (e.g., the protocols and the field names and their values). The PDML specification is a way to organize this information. A PDML document lists all of the packets contained in a capture file, detailing the most important information for every protocol that was found in the packet and for each field that was decoded within the protocol. Appendix F includes a sample PDML file that corresponds to the pcap file in Appendix E. Appendix F forms part of this disclosure.

In 240, a scenario may be generated based on the pcap and the PDML. The pcap that is used may be the pcap that was loaded into the network packet analyzer in 220. The PDML that is used may be the PDML that was output by the network packet analyzer in 230.

Figure 3:
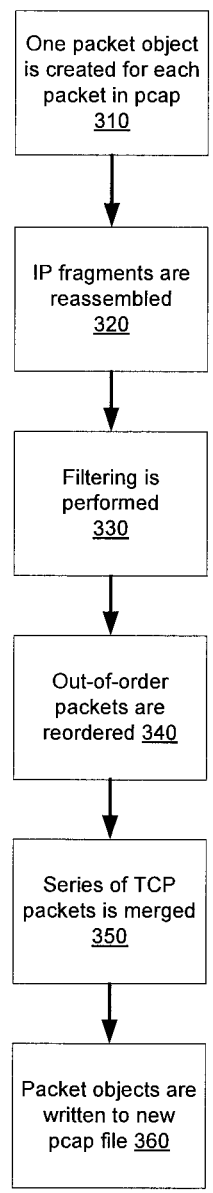
FIG. 3 is a flowchart of an example method for refining a packet capture, according to one example embodiment of the invention.

FIG. 3 is a flowchart of an example method for refining a packet capture, according to one example embodiment of the invention. FIG. 3 provides more detail regarding box 210 of FIG. 2. Appendix G includes a sample refined pcap file that corresponds to the (unrefined) pcap file in Appendix E. (Again, since the .pcap format is binary, some portions of the file are not alphanumeric characters and thus are unreadable.) Appendix H includes a sample PDML file that was generated by a network packet analyzer based on the refined pcap file in Appendix G. Appendices G and H form part of this disclosure.

Note the differences between Appendix F (PDML based on an unrefined pcap file) and Appendix H (PDML based on a refined pcap file). When a network packet analyzer receives an unrefined pcap (e.g., Appendix E), the PDML information is output on a packet-by-packet basis (e.g., Appendix F). However, when a network packet analyzer receives a refined pcap (e.g., Appendix G), the PDML information is output on a message-by-message basis instead (e.g., Appendix H).

In 310, one packet object is created for each packet in the pcap. In one example embodiment, a packet object may be created by performing the following procedure: a) read in packet; b) read protocol headers at various levels and perform various error-checking; and c) identify the top-level protocol. After performing these actions for one packet, the data in the packet will have been modeled as an object that represents the payload of that top-level protocol. After performing these actions for all of the packets in the pcap, each packet will have been modeled as an object that represents the payload of a particular protocol.

In 320, IP fragments are reassembled (if necessary). If the maximum transmission unit (MTU) of a network interface is smaller than the size of the IP datagram, then an operating system will generate IP fragments. The following 4-tuple uniquely identifies these IP fragments: source IP, destination IP, protocol, and IP identifier. In 320, multiple packet objects that have the same 4-tuple are combined, and a single packet object that represents the logical IP datagram is generated.

In 330, filtering is performed (if necessary). If data on higher-level transports is present (e.g., TCP, UDP, or SCTP), then lower-level transports may be ignored (e.g., Ethernet and IP), since these lower layers can be automatically generated at run time. Some well-known UDP protocols may also be ignored (e.g., DNS and DHCP), since these well-known UDP protocols are probably side-effects of the higher-level data that is being sent and, therefore, may be ignored. Packet objects that have these well-known UDP protocols may be filtered out from the list of packet objects.

It will be appreciated that the ability to filter out the lower level transport in the packet capture during scenario creation and replace it with an abstracted transport may provide many benefits. One benefit is that when the scenario is replayed, the transport layer protocol packets may be generated directly by the operating system to communicate with the target service or device statefully. This contrasts with other playback tools that simply replay the original TCP packets as captured. This allows for stateful interaction with the device being tested with correct address information, which in turn allows scenarios to be replayed through devices that perform Network Address Translation (NAT) and/or act as transport-layer proxy devices where the ports can be re-written in between the testing software and the device or service to be tested.

Another benefit of filtering out the lower level transport in the packet capture during scenario creation is the ability to create the scenario with a different lower level transport altogether. Possible examples are replacing the TCP transport in the source packet capture with UDP in the resulting scenario, or replacing TCP in the source packet capture with SSL in the resulting scenario.

It will also be appreciated that if testing a multiple protocol exchange that includes encrypted transport, it may be convenient to generate the scenario using a cleartext patent traffic and then generate the test cases by substituting an encrypted transport for an unencrypted transport, either in the scenario itself, or when the tests are generated.

In 340, out-of-order TCP or SCTP packets may be reordered (if necessary). TCP or SCTP packets in a pcap might have been captured in incorrect order. However, these packets have sequence numbers that can be used to sort the packet objects in order to recover the correct sequence of bytes in the logical stream.

In 350, a series of TCP packets (all from one side, without any intervening data from the other side) may be merged together into one packet. TCP is a stream-oriented protocol where the message boundaries are provided by the application layer. In most cases, a single TCP packet will not contain the logical message that the application wants to be delivered to the other side. So an HTTP response might, for example, span multiple packet objects. In this case, these multiple packet objects from one side of the conversation are combined into a contiguous logical message. However, if there are multiple requests and responses in the same TCP connection, then packets-carrying-data from one side are used as the end-of-message marker for the other side.

In 360, the in-memory packet objects may be written to a new pcap file. This new pcap file represents the refined pcap. The PDML is generated using this refined pcap (see 220 and 230), since the refined pcap enables the network analyzer to "see" the entire logical message for decoding purposes.

In one example embodiment, scenario information may be stored in an object called a scenario object. A scenario object includes, for example, information regarding hosts and information regarding steps. A host participates in a message exchange as either a sender or a receiver (or both). A step represents an action (e.g., sending or receiving a message) and a transport. A send action includes a "field", which represents the data or payload of a message and can be parameterized using variables. A receive action can include an "assertion" and/or a "variable". An assertion checks the content of a message (e.g., using a regular expression) and outputs the result of a Boolean expression based on the data values. A variable extracts data from a message (e.g., an authentication token). The variable value can then be used in a later action (e.g., a send action, as described above).

In one example embodiment, host information is stored in a table called a host table. Each entry in the host table represents one host, which is a participant in a message exchange. An entry includes, for example, an IP address and a type (e.g., IPv4, IPv6, or layer-2) that describe the host.

In one example embodiment, step information is stored as transport information and action information. Transport information includes a set of transport objects. Action information includes a set of actions.

In one example embodiment, action information may be stored in a table called a flow table. It will be appreciated that the flow table may be any convenient data structure or object, and need not be a "table" or array as such. Each entry in the flow table represents one flow, which is a specific message exchange between two participants (conversation). A flow table entry includes, for example, a source identifier, a destination identifier, a protocol identifier (e.g., IP, TCP, UDP, or SCTP), and a list of packet entries. A packet entry includes, for example, an index number and a direction. The index number identifies a particular packet within a pcap. The direction indicates whether the packet represents a message from the source to the destination (e.g., forward direction) or a message from the destination to the source (e.g., backward direction). In one example embodiment, the flow table is implemented as hash map where the key is the source identifier/destination identifier/protocol identifier 3-tuple, and the value is the list of packet entries.

In one example embodiment, transport information may be stored in an object called a transport object. A transport object includes, for example, a source host, at least one destination host, and a timeout. The timeout indicates how long to wait for a response message. Each flow entry in the flow table is associated with one transport object, which represents the highest-level protocol used in that flow.

The types of identifiers used for the source and destination in a flow entry and a transport object can differ based on the protocol used in the flow and transport. For example, if the protocol is TCP, UDP, or SCTP, then the identifiers may be IP addresses and port numbers. If the protocol is IP, then the identifiers may be IP addresses. If the protocol is Ethernet, then the identifiers may be MAC addresses.

Figure 4:
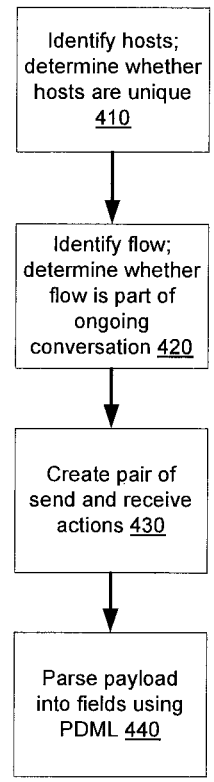
FIG. 4 is a flowchart of an example method for generating a set of objects based on a packet capture and a PDML file, according to one example embodiment of the invention.

FIG. 4 is a flowchart of an example method for generating a set of objects based on a packet capture and a PDML file, according to one example embodiment of the invention. FIG. 4 provides more detail regarding box 240 of FIG. 2. Specifically, the method in FIG. 4 is performed for each packet in the pcap. This identifies unique hosts and flows, creates transport objects, and maps each packet to an action in a flow. After this is done, a scenario is written out to a file based on the hosts, flows, transport objects, and mappings.

In 410, hosts within the packet are identified. For example, at least one source host and at least one destination host are identified. A determination is made regarding whether the hosts are unique. For example, a determination is made regarding whether the hosts have been encountered before in the pcap currently being processed. The determination is made, for example, by searching for the host in the host table. If a host is unique (e.g., the host has not been encountered before), then the host information is added to the host table. If a host is not unique (e.g., the host has been encountered before), then the host information is already in the host table, and no action is performed.

In 420, the flow within the packet is identified. For example, the source identifier and the destination identifier are determined. A determination is made regarding whether the flow is unique. For example, a determination is made regarding whether the flow is part of an ongoing conversation in the pcap currently being processed. The determination is made, for example, by searching for the flow in the flow table. Box 420 differs based on whether the packet is a unicast packet or a multicast packet, as follows:

Unicast packet—If the packet is a unicast packet, then a determination is made regarding whether the packet's flow (from source identifier to destination identifier) has been encountered before. The determination is made, for example, by searching for that flow in the flow table. If the packet's flow has been encountered before, then a corresponding flow entry will be found, and the packet is added to that flow entry's list of packet entries (using the appropriate index number and the forward direction, as described above).

If the packet's flow has not been encountered before, then the reverse of that flow is searched for in the flow table (from destination identifier to source identifier; this means that the packet is a response to an earlier request). If the packet's reverse flow has been encountered before, then a corresponding flow entry will be found, and the packet is added to that flow entry's list of packet entries (using the appropriate index number and the backward direction, as described above).

If the packet's reverse flow has not been encountered before, then the flow table is checked for a multicast flow where the source of the multicast flow is the source or the destination of the unicast packet being processed. If such a multicast flow is found, then the transport object associated with that flow entry is updated so that the transport object's destination identifier is mapped to the unicast packet's source identifier or destination identifier (whichever identifier differs from the transport object's source identifier). The transport object is now mapped to a unicast flow. The packet is added to that flow entry's list of packet entries (using the appropriate index number and direction, as described above).

If such a multicast flow is not found, then the packet's flow is unique. The flow is added to the flow table, and a transport object is created and associated with the flow entry. The packet is added to that flow entry's list of packet entries (using the appropriate index number and the forward direction, as described above).

Multicast packet—If the packet is a multicast packet, then the flow table is checked for a unicast flow where the source or destination of the unicast flow is the source of the multicast packet being processed. If such a unicast flow is found, then the packet is added to that flow entry's list of packet entries (using the appropriate index number and direction, as described above).

If such a unicast flow is not found, then the flow table is checked for a multicast flow that has the same source and destination as the multicast packet being processed. If such a multicast flow is found, then the packet is added to that flow entry's list of packet entries (using the appropriate index number and direction, as described above).

If such a multicast flow is not found, then the packet's flow is unique. The flow is added to the flow table, and a transport object is created and associated with the flow entry. The packet is added to that flow entry's list of packet entries (using the appropriate index number and the forward direction, as described above).

With the above actions, it is possible that a multicast packet could end up in its own flow even though, in reality, it is associated with a unicast flow that follows. For example, if A does a multicast query, B does a multicast response, and then A and B start talking to each other, this will end up creating two flows. In one example embodiment, the above action are performed again in a second pass in order to match these multicast packets and avoid this situation.

After 420 has been performed for a particular packet, a transport object exists that is associated with this packet and flow. Various properties of the transport object (e.g., source identifier and destination identifier) are embedded as properties of the transport object.

In 430, a pair of send and receive actions is created to represent the packet. The pair is either client_send/server_receive or server_send/client_receive. For example, if the corresponding entry in the flow entry's list of packet entries has the forward direction, then the pair is "client_send/server_receive." If the corresponding entry has the backward direction, then the pair is "server_send/client_receive."

In 440, the packet's payload is parsed into fields using the PDML that represents this packet. Recall that a send action includes a "field", which represents the data or payload of a message. The data/payload corresponds to a data value and an encoding for that data value (e.g., base64 encoding). The data value can be a simple value (e.g., "hello world") or a set of sub-fields. Since a field can contain sub-fields, this leads to a hierarchy of fields. PDML is used to reconstruct this field hierarchy of the packet's payload.

After the method in FIG. 4 has been performed for all of the packets in the pcap, the pcap has been converted into a set of hosts, a set of transport objects, and a series of send/receive pairs, where each send/receive pair is associated with one transport object. A scenario is then written out to a file based on the hosts, transport objects, and send/receive pairs. The scenario can be in the Mu Scenario Template language (XML) or the Mu Scenario Language (scripting language).

Figure 5:
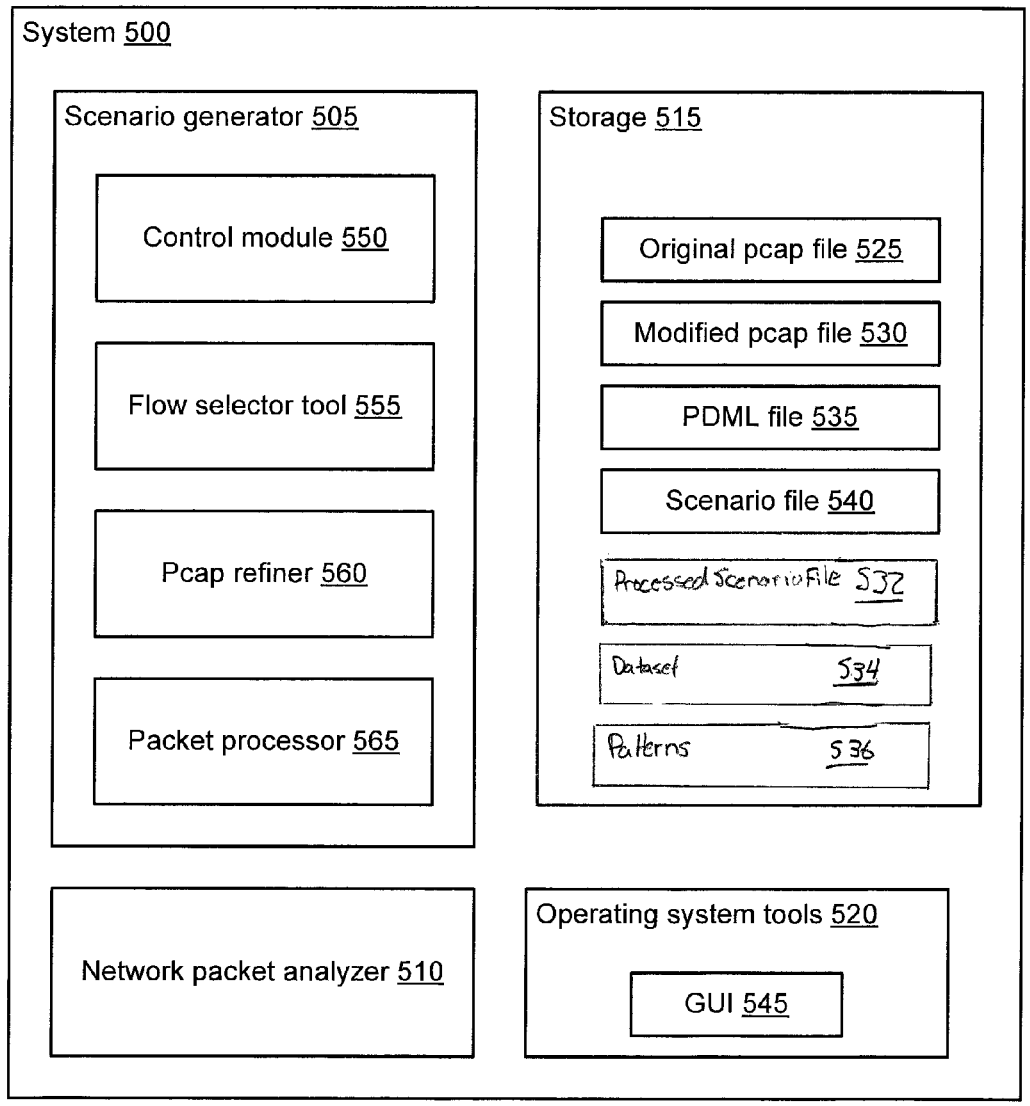
FIG. 5 is a block diagram of a system with a scenario generator for generating a scenario based on a packet capture, according to one example embodiment of the invention.

FIG. 5 is a block diagram of a system with a scenario generator for generating a scenario based on a packet capture, according to one example embodiment of the invention. The system 500 is able to generate a scenario based on a packet capture. The illustrated system 500 includes a scenario generator 505, a network packet analyzer 510, storage 515, and operating system tools 520.

In one example embodiment, the scenario generator 505 (and its component modules), the network packet analyzer 510, and the operating system tools 520 are one or more computer program modules stored on one or more computer readable storage mediums and executing on one or more processors. The storage 515 (and its contents) is stored on one or more computer readable storage mediums. Additionally, the scenario generator 505 (and its component modules), the network packet analyzer 510, the operating system tools 520, and the storage 515 are communicatively coupled to one another to at least the extent that data can be passed between them. In one example embodiment, the operating system tools 520 are executing as one or more parts of an operating system on a personal computer, and the scenario generator 505 and the network packet analyzer 510 are executing on the same personal computer.

The storage 515 stores a packet capture (pcap) file and various files related to the pcap file. The illustrated storage 515 includes an original pcap file 525, a modified pcap file 530, a PDML file 535, and a scenario file 540. The original pcap file 525 is the pcap file that is loaded into the scenario generator in box 120 of FIG. 1. The modified pcap file 530 is first the original pcap file with filters applied (box 130 of FIG. 1) and then the refined pcap file (box 210 of FIG. 2). Note that the modified pcap file 530 is optional. If no filters were applied (box 130) and no refinements were performed (box 210), then no modified pcap file 530 will exist. The PDML file 535 is the PDML file that was output by the network packet analyzer (box 230 of FIG. 2). The scenario file 540 is the scenario file that was generated after the method 400 in FIG. 4 was performed for all of the packets in the pcap.

The operating system tools 520 include a graphical user interface (GUI) 545. The GUI 545 outputs information to a user (e.g., using a display device) and receives information from a user (e.g., using a pointing device and/or keyboard).

The network packet analyzer 510 is a conventional network packet analyzer such as Wireshark.

The scenario generator 505 includes several modules, such as a control module 550, a flow selector tool 555, a pcap refiner 560, and a packet processor 565. The control module 550 controls the operation of the scenario generator 505 (e.g., its various modules) so that the scenario generator 505 can generate a scenario based on a packet capture.

The flow selector tool 555 enables a user to specify one or more filters that are used to narrow the list of flows or packets in a pcap (box 130 in FIG. 1). The pcap with the narrowed list is stored in the modified pcap file 530. The user interaction is performed using the GUI 545. Note that the flow selector tool 555 is optional. If the flow selector tool 555 is absent, then the list of flows or packets in a pcap is not narrowed.

The pcap refiner 560 refines a pcap (box 210 in FIG. 2; all of FIG. 3). The refined pcap is stored in the modified pcap file 530. Note that the pcap refiner 560 is optional. If the pcap refiner 560 is absent, then the pcap is not refined. The packet processor 565 generates a set of objects based on a packet capture and a PDML file (FIG. 4). Regarding 440 in FIG. 4, note that a protocol dissector (such as Wireshark) performs the task of converting unstructured data (such as a packet capture) into a human-readable representation of that data. For network traffic represented in an unstructured form such as the libpcap format, this means breaking apart a byte stream into a hierarchy of fields with some fields containing actual values and other fields containing a sub-hierarchy of fields.

By obtaining the output of a protocol dissector (e.g., PDML) and cross-referencing the output against the starting bytes in the pcap, it may be possible to recreate a field hierarchy that maps original bytes and offsets (in the pcap, which are encoded) to actual pre-encoded values. It is also possible to infer encoding rules for the data by comparing the raw bytes (which are encoded) with the human-readable values (which are not encoded). For example, if the raw bytes represented in hexadecimal notation are "68656c6c6f20776f726c6400" ("hello world\000") and the displayed value is "hello world", then it can be inferred that the encoding function is to append a null character to a starting value. The decoding function may be identified by submitting the starting string to a series of candidate decoding functions until a decoding function that produces a value that matches the human-readable value provided by the dissector is identified. Once identified, an encoding or decoding function has been identified, the other in the pair (decoding or encoding, respectively) can be identified as the inverse.

For example, the following simple binary field types may be recognized in this way:
- null-terminated string
- Pascal string
- plain/unadorned ASCII string
- IPv4 address
- IPv6 address
- MAC address
- Unit (unsigned integer)

The endian-ness of these types may be determined by trying both possible byte orders and selecting the order which best matches the human-readable string displayed by the dissector. Complex data types with well-defined rules may also be recognized by attempting to parse the raw bytes using those rules. Complex data types that can be recognized in this manner may include XML and ASN.1.

In this way, it is possible to construct a field hierarchy that can reproduce the original packet. Because the field hierarchy has both the underlying values and encoding rules for each field, the packet can be recreated by recursively outputting the field hierarchy applying necessary encoding functions after outputting each field's value or sub-fields. And because the underlying data is represented separately of the encoding rule for each field, the underlying data can be modified in a user-friendly way. For example, a field may be base64 encoded, but if the underlying value is "hello world", "hello world" can be shown to the end user, who can change the underlying value to "hi mom" without having to worry about the details of base64 encoding. This enables the end user to think in terms of actual human readable values of their problem domain or application.

The heuristics described above for mapping protocol dissector output to a field hierarchy may be insufficient in cases where there are output rules that cannot be inferred from inspecting protocol dissector output. An example would be the case of a padding field in a protocol like Diameter. A Diameter protocol message includes AVP fields that are padded by null characters so that the total field size is a multiple of four bytes. This padding will not be present if the field size is already a multiple of four bytes. Furthermore, when padding is present, it may not be explicitly identified by the protocol dissector, because the padding may be presumed by the protocol dissector to be of little interest to the protocol dissector's intended audience. In this case, it may be useful for the scenario creation process to:

1.) Map the Diameter AVP as presented by the dissector to a scenario field that pads its output as required by Diameter.
2.) Programmatically recognize padding fields that are not explicitly identified by the protocol dissector and exclude them from the scenario to prevent double padding.

This mapping and recognition may be accomplished by having a protocol specific scenario creation procedure that runs only when a certain protocol is identified and only within the portion of the field hierarchy that can be identified as implementing that protocol. The identification of the portion of a field hierarchy that implements the protocol of interest may be accomplished by inspection of the dissector output. The modifications necessary for each protocol may be provided in protocol specific modules. When a protocol with additional rules is identified, the portion of the scenario field hierarchy may be passed to the relevant module where the necessary corrections and adjustments may be made.

The protocol specific modules may have uses that include:
1.) Handling cases like Diameter AVP padding described above.
2.) Creating scenario fields that cannot be readily identified from dissector output except when the protocol context is known. For example, the FDDI checksum used in FibreChannel over Ethernet (FCoE) may not be fully specified by the dissector output. The dissector output may simply describe it as a checksum without describing what kind of checksum. The dissector output may also not state what fields are covered by the checksum. But this information may be provided in a protocol specific module for FCoE so that necessary adjustments may be made to produce a correct scenario field hierarchy.
3.) In some cases, there may be protocol specific bugs in the dissector output. A protocol specific automarkup module may be used to correct or work around protocol specific dissector bugs The fields in a field hierarchy may include transport fields and data fields. Transport fields may contain other transport fields but will, at some point, contain data fields. For example, an RTSP message might have a hierarchy of fields, such as:

Ethernet
  IP
    UDP
      RTSP
        (body/data)

For purposes of outputting the message, each field may be formatted using encoding rules described above. But an additional degree of flexibility may also be provided for that correspond to network protocols. Once the RTSP message with header and body is identified, further outputting may be delegated to the operating system's network stack. Instead of outputting necessary bytes for a UDP header as part of a specified test, the OS Socket API can be used to directly write the RTSP body to a UDP socket. Outputting to the socket can be thought of as short circuiting evaluation of the field hierarchy by introducing the encoding rule "send to udp socket" for the RTSP field. With this abstraction in place, it become easy to expose this to the end user and provides them with the flexibility of replaying a transaction recorded over UDP over an alternate transport such as SSL/TLS or SCTP.

The field hierarchy (which may include of values and encoding rules) may enable an end user to easily edit both the contents of message (data fields) or the way the message is communicated (protocol fields). In either case, the end user does not have to worry about the details of ensuring the message is well-formed because this is taken care of by the explicit encoding rules or by the networking API.

Recall that since the test cases for mutation testing and, in some example embodiments, scale testing tracks, may be stateful, the messages may be recreated with state being maintained. The goal in reproducing packets is generally to interact with real devices. For example, a user may want to replay the server half of a client-server interaction against an actual client. Exactly replaying the appropriate portion of the original transaction is often not sufficient to induce the other host to complete the transaction. For example, a SIP server is being emulated, protocol rules obligate the inclusion of the client-provided Call-Id in our responses. The only way to satisfy a requirement like this is to replay the conversation in a stateful way.

Inserting state into a field/message hierarchy that models a conversation may be accomplished in the following way:
1) Scan the original messages in the order they were exchanged.
2) To each message, apply a regular expression that identifies the stateful field. For example, "Call-Id: (.*)\r\n" as a whole identifies the Call-Id header, and the first group in the regular expression identifies the dynamic/stateful portion.
3) Keep track of ownership of each dynamic value on a per-host pair basis. The "owning host" is the host that determines the value for a given field, and the "parsing host" is the host that uses that value in some way. This record keeping can be accomplished by maintaining a hash table which maps the extracted token (the group from the regular expression) to a 3-tuple including the "owning host", a rule for generating the "owning host" value, and a rule for generating the "parsing host" value. When a token is encountered, the owning host is determined by consulting the ownership table. If there is no entry for that token, ownership may be assigned to the sender of the current message and the rules for setting and parsing the value may be inserted.
4) When a Call-Id header to the message hierarchy is inserted, the original string value may be replaced with the dynamic rule. If the current message was sent by the recorded owner of the token being replaced, the "owning host" rule may be chosen. Otherwise, the "parsing host" rule may be chosen.

An example owning host rule for SIP Call-Id might be "generate a string of 10 random alphanumeric characters and use that value for remainder of the transaction". An example parsing host rule for the SIP Call-Id would be "apply the regex 'Call-Id: (.*)\r\n' to the first message received and extract the value of the first group".

The procedure specified here for the SIP Call-Id may be generically applicable any time a token that is passed back and forth between a pair of hosts and that token is addressable by a regular expression, a byte offset, or some other mechanism. The approach notably does not require an understanding of the exact rules for when to generate a new value and which host is the owner or parser. This information is inferred by applying the above procedure to the original transaction. Examples where this approach can be applied include DNS transaction IDs, NFS file handles, and cookies used by various protocols. With SIP, it is possible to realistically replay complex transactions against actual endpoints by using a relatively small and simple set of markup rules that include the Call-Id header value, CSeq header value, Tag parameters from To and From headers, and branch parameter from the Via header.

Dynamic field values provided by markup like this may also extend to signaling of ports. In the case of SIP, a user can capture port numbers from the SDP portion of the message and then cross-reference against destination ports in subsequent media streams. When a match is found, the user can insert the "parsing host" as the value for the destination port for subsequent messages that will be sent over a UDP socket. This signaling may allow replay of a SIP signaled telephone call and have the media sent to whatever destination port is dynamically allocated by the SIP phone being called. This signaling logic is equally applicable to portmapper-provided ports for NFS transactions or FTP data channel ports.

The ability to replay a transaction will sometimes hinge on being able to ignore extra unexpected messages. In the case of SIP, the host initiating a call may receive several "180 Ringing" messages before the "200 OK" that indicates the call has gone through and contains the SDP. The calling party should not try to extract the media port from the SDP on the "180 Ringing" because that message will not have an SDP. This problem can be handled by making the act of extracting a value from a message an implicit loop that continues until it succeeds or a timeout period has expired. In the case of the extra "180 Ringing" message, the regular expression for parsing the audio port will fail to be satisfied. This will cause that message to be discarded until the "200 OK" arrives with an SDP. The problem of unexpected (e.g., not in the reference transaction/message exchange gleaned from the original unrefined pcap) extra messages can be addressed generically for the HTTP family of protocols by attempting to parse out all non-provisional status codes, while at the same time not parsing out status codes for provisional messages (100 series status codes). This causes extra provisional messages to be ignored because they fail to satisfy a regular expression that is looking for the subsequent non-provisional response such as a "200 OK" or a "401 Unauthorized".

SCTP is a well-known protocol over which network communications (conversations) between the participants occur, or "transport". SCTP design differs significantly from that of TCP and UDP in the following areas:

UDP provides unreliable out-of-sequence delivery, which make it unsuitable for applications that require reliable network communications. TCP provides reliable delivery with strict sequencing, which introduces "head-of-line" blocking (no data can be delivered to an application until the next-in-sequence data chunk arrives). SCTP provides reliable delivery with optional sequencing, which is desirable by the network applications affected by data latency.

TCP is a "stream-based" transport that delivers application data as a single contiguous stream, which imposes additional overhead on the network applications that need to "break up" the data stream into individual data packets. SCTP allows applications to maintain multiple data "streams" within a single association, which reduces resource and processing overhead while allowing applications to maintain "logical" separation of data in different "streams". Data in each stream can be delivered in strict order or out-of-sequence.

TCP does not provide any high-availability features. The conversation occurs between two endpoints identified by their network addresses, and network applications that wish to provide high availability must implement it. SCTP allows an application to use any number of endpoints in the same conversation and provides a robust mechanism to detect endpoints that are no longer available (path management).

TCP is relatively vulnerable to denial-of-service attacks, such as SYN attacks. SCTP connection establishment mechanism prevents such attacks.

During its life cycle, a SCTP conversation goes through three main stages:

1) Association start-up—A cookie mechanism is employed during the initialization to provide protection against synchronization attacks. The cookie mechanism uses a four-way handshake, the last two legs of which are allowed to carry user data for fast setup. The four-way handshake may include the following messages:

a) INIT—The initiator of SCTP conversation sends this message to notify the recipient of the intent to establish a conversation. In this message, the sender specifies a random integer called "Initiator Verification Tag".

b) INIT-ACK—The responder in SCTP conversation uses this message to confirm its willingness to establish conversation and specifies a random integer called "Responder Verification Tag", which together with the "Initiator Verification Tag" and source/destination port numbers will be used to uniquely identify SCTP conversation. In addition, the responder generates a unique sequence of bytes called "State Cookie".

c) COOKIE-ECHO—The initiator of SCTP conversation sends this message to confirm the receipt of "State Cookie". Application data can also be included.

d) COOKIE-ACK—The responder in SCTP uses this message to confirm that association has been established. Application data can also be included.

2) Association maintenance—Both sides in SCTP conversation exchange data (user data transfer) using DATA messages. The receipt of each DATA message is acknowledged using SACK message. (One SACK message can be used to acknowledge the receipt of multiple DATA messages.) In addition, SCTP transport performs the following tasks in the background:

a) Optional re-ordering of data within "streams"—when application requests ordered data delivery b) User data fragmentation and reassembly—SCTP transport breaks up user data into separate "chunks" before sending when the size of a message on the wire exceeds MTU (Maximum Transmission Unit) defined for the network segment. The receiving size re-assembles the data before delivering it to the application.

c) Chunk bundling—SCTP transport can also "bundle" multiple "chunks" into a single message as long as the message can be transmitted on the wire. The receiving size will split the message into separate "chunks" before delivering it to the application.

d) Path management—SCTP transport maintains the list of "active", "idle", and "inactive" endpoints using the heartbeat mechanism that involves sending/receiving of HEART-BEAT/HEARTBEAT-ACK messages.

3) Association shutdown—SCTP provides for graceful close (e.g., shutdown) of an active association or ungraceful close (e.g., abort), either on request from the user or as a result of an error condition detected within the SCTP layer. SCTP does not support a half-open state (like TCP) wherein one side may continue sending data while the other end is closed. When either endpoint performs a shutdown, the association on each peer will stop accepting new data from its user and only deliver data in queue at the time of the graceful close.

In TCP conversation, each individual packet contains all the information required to associate it with the flow (source address/port and destination address/port pairs), which allows to avoid maintaining any state (or maintaining minimal state) during flow analysis. By contrast, SCTP conversation (flow) is identified by the source and destination ports as well as a pair of "Verification Tags" specified in INIT/INIT-ACK messages.

Unlike TCP messages that contain unstructured application data (raw bytes), SCTP messages are divided into "chunks". Each "chunk" represents a separate data unit with its own attributes that define "chunk" boundaries, sequencing, etc. and optionally carries application (user) data belonging to one of the "streams". SCTP messages (with exception of INIT/INIT-ACK and SHUTDOWN-*messages) may contain multiple "chunks". For example, SCTP messages containing user data may contain multiple DATA and SACK "chunks".

Packet flow identification—When SCTP transport is detected, each INIT and INIT-ACK message may be analyzed to determine the "Flow ID", which may include source and destination port numbers and a pair of "Verification Tags" included in these messages. This information (state) is maintained during the entire packet capture analysis to ensure proper identification of the following SCTP messages.

SCTP message filtering—all other SCTP messages may be filtered based on the types of the "chunks" they are carrying. In general, only SCTP messages that contain user data (carrying DATA "chunks") are kept for further analysis.

Step generation—Remaining SCTP messages are broken down into "chunks". A separate send/receive step is generated for each DATA "chunk" to observe "logical" separation of data "streams" within SCTP association. In other words, two DATA "chunks" that belong to two different streams will generate two separate send/receive steps.

Payload parsing—The payload is parsed into the fields using PPID (payload protocol identifier) that is associated with each DATA "chunk". This is different from TCP/UDP where source/destination port numbers are used to identify and parse the payload.

Figure 6:
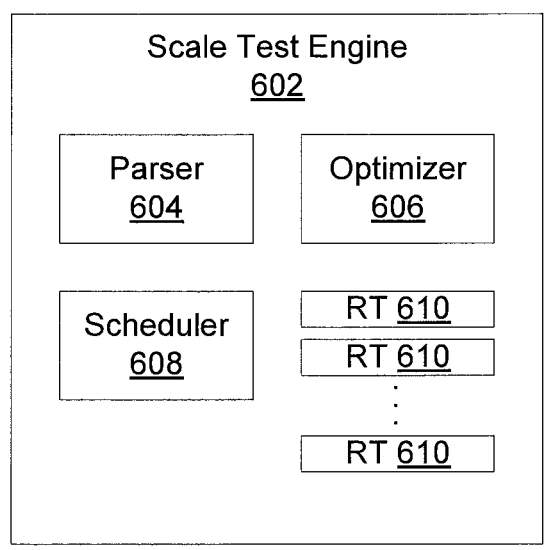
FIG. 6 is a block diagram of a scale test engine for processing one or more scenarios, generating and executing tracks for scale testing.

FIG. 6 is a block diagram of a scale test engine 602 for processing one or more scenarios, generating tracks for scale testing and executing the tracks. The scale test engine 602 may be executed by a computer system. For example, in various example embodiments, the scale test engine 602 may be executed by the system 500 illustrated in FIG. 5. In other example embodiments, the scale test engine 602 may be executed by a system that does not also generate scenarios. The scale test engine 602 may comprise a parser module 604, an optimizer module 606, a scheduler 608 and, in some example embodiments, one o more runtimes 610. The parser 604 may receive a scenario (e.g., expressed in a scripting language such as the MuSL, a mark-up language such as XML, etc.). The parser 604 may perform various processing on the scenario to facilitate scale testing, for example, as described herein. The optimizer 606 may perform additional processing on the scenario to facilitate scale testing, as described herein. The result of the parser 604 and/or the optimizer 606 may be referred to as a processed scenario, which, in example embodiments, may be partially or totally immutable.

The scheduler 608 and the one or more runtimes 610 may execute and manage scale testing based on the processed scenarios. For example, the processed scenarios may be included in tracks comprising the processed scenario, a pattern, and a dataset. In various example embodiments, the tracks may be executed asynchronously. One or more runtimes 610 may execute the track by executing a number of concurrencies of the processed scenario consistent with the pattern and, in example embodiments, utilizing variable and/or option values as set forth in the dataset. In various example embodiments, the one or more processed scenario files, datasets, and patterns may be stored in a storage of the system implementing the scale test engine 602. For example, as indicated by 532, 534 and 536 shown at the storage 515 of the system 500. Also, although the functionality of the parser 604, optimizer 606, scheduler 608 and runtimes 610 are illustrated herein as part of a common scale test engine 602, it will be appreciated that these components may be implemented separately. Also, in various example embodiments, the functionality of some or all of the components may be merged. For example, the parser 604 and optimizer 606 may be merged into a common module.

Figure 7:
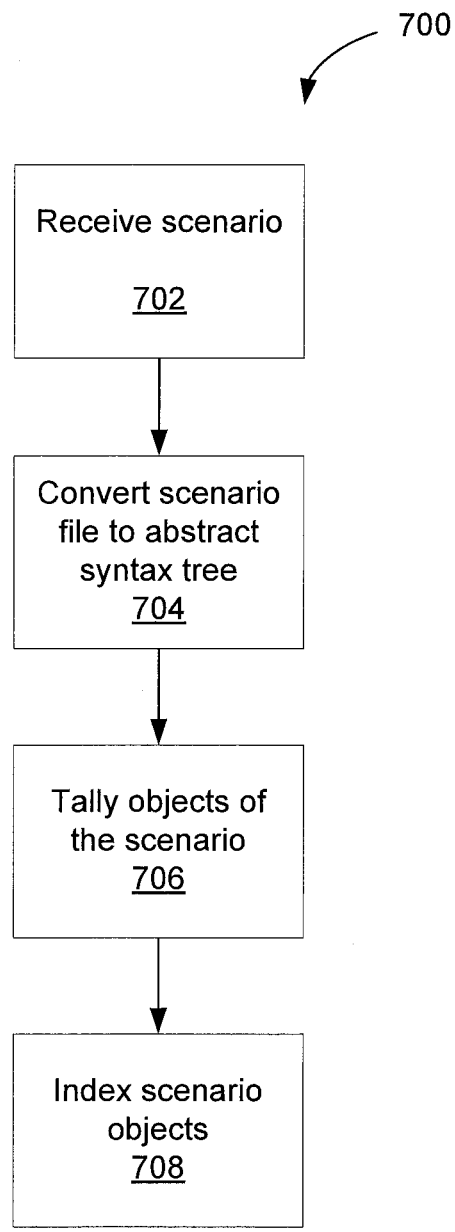
FIG. 7 is a flowchart of an example method for parsing a scenario for scale testing.

FIG. 7 is a flowchart of an example method 700 for parsing a scenario for scale testing. In various example embodiments, the example method 700 may be implemented by the parser 604. At 702, the parser 604 may receive a scenario. The received scenario may be expressed in any suitable scenario representation language. For example, the scenario may be expressed in the MuSL language, XML, etc., as described herein. At 704, the parser 604 may convert the scenario to an abstract syntax tree. For example, each node or sub-tree of the scenario or abstract syntax tree may indicate an element of the syntax of the underlying message flow or flows. The scenario as abstract syntax tree may be represented in any suitable format including, for example, JavaScript Object Notation (JSON), Process and Experiment Realtime Language (PEARL), Python, XML, etc.

At 706, the parser 604 may tally the objects of the scenario (e.g., hosts, options, variables, steps, etc.). The objects, for example, may be expressed as sub-trees and/or nodes of the abstract syntax tree. At 708, the parser may index the tallied scenario objects. In various example embodiments, this may increase the efficiency of memory allocation for the runtime 610 executing concurrencies of the scenario because memory need only be allocated for the exact number of included objects. For example, if a scenario contains two variables, then the runtime 610 executing a concurrency of the scenario may only need to allocate two logical memory locations for holding values for these variables. It will be appreciated that the tallying and indexing at 706 and 708 may be performed after or before the scenario is converted to the abstract syntax tree.

Figure 8:
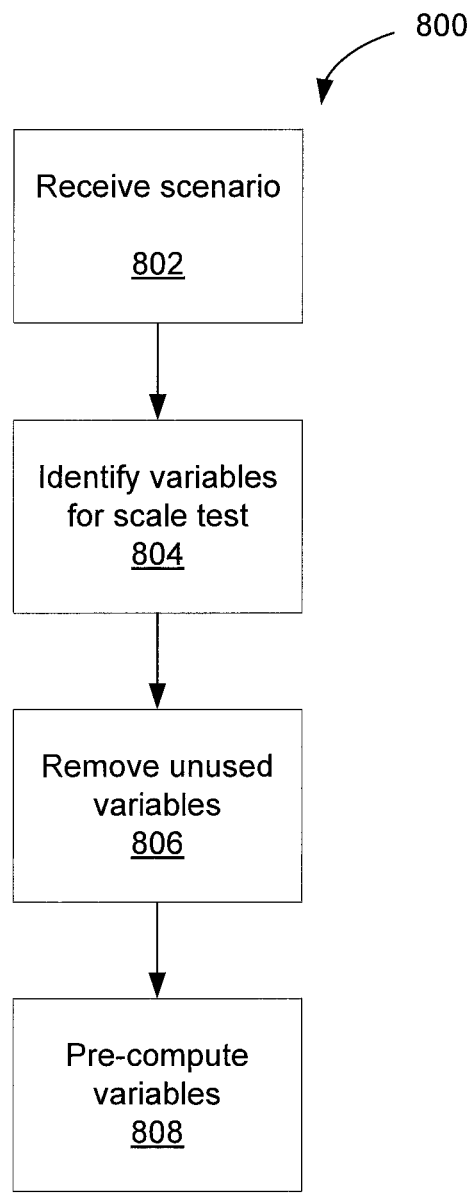
FIG. 8 is a flowchart of an example method for optimizing a scenario for scale testing.

FIG. 8 is a flowchart of an example method 800 for optimizing a scenario for scale testing (e.g., after parsing by the parser 604). At 802, the optimizer 606 may receive a scenario. The scenario may be expressed in any suitable format. For example, the scenario may be expressed as an abstract syntax tree in JSON or any other suitable format as derived by the parser 604 and described above. At 804, the optimizer 606 may identify variables that will be used for scale testing. In embodiments where the scenario may be used for purposes other than scale testing (e.g., mutation testing) it may contain variables that are not necessary and/or desirable for scale testing. For example, a scenario that is also usable for mutation testing may comprise variables related to protocol details that, while useful for generating mutated protocol test cases, may reduce execution efficiency for scale testing. On the other hand, it may be desirable to maintain some scenario variables for scale testing. Examples of such variables may include, for example, host addresses, etc. Also, it will be appreciated that some variables may be declared in the scenario, but not actually used. At 806, unused variables (e.g., those not identified at 804) may be removed. For example, the declaration of unused variables may be removed. For the case of variables that are present in the scenario, but not to be used for scale testing, instances of the variable within the scenario may be set to a default value. In this way, the memory allocation for a run time 610 executing a concurrency of the scenario may be reduced, thus increasing system efficiency.

At 808, the optimizer 606 may pre-compute values of the variables and/or options that are to be used for scale testing. It will be appreciated that 808 may be performed by the optimizer 606, or by any other component of the scale test engine 602 or other system or engine at any time prior to run time. Pre-computing values for variables may involve generating a finite number of random values for each variable. It will be appreciated that generating random values may be computationally expensive, especially when done on a large scale at run time. Accordingly, pre-computing random values may reduce the resources necessary for each concurrency at run time. In one example embodiment, pre-computation of variable values may be desirable when modeling a finite number of hosts contacting a device under test. For example, if the scale test parameters specify that no more than 100,000 hosts at a time will contact the device under test, then 100,000 values for host addresses may be pre-computed. In this way, no concurrently executing scenarios will present hosts having the same address. Results of the pre-computation may be stored as the dataset 534.

Figure 9:
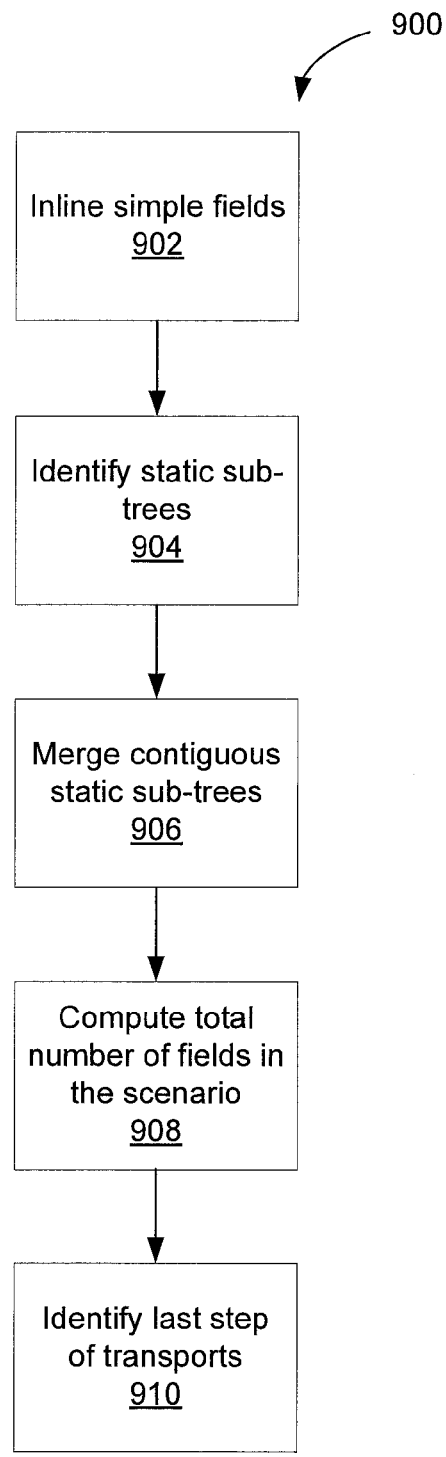
FIG. 9 is a flowchart of an additional example method for optimizing the payload of a scenario for scale testing.

FIG. 9 is a flowchart of an additional example method 900 for optimizing the payload of a scenario for scale testing. The payload of a scenario may be data transmitted by the one or more message flows modeled by the scenario. For example, when a scenario is used for mutation testing and/or other similar purposes, it may be desirable to have many portions of the payload that may be modified. Also, when the scenario is in a format intended to be human-readable, it may be desirable to express some concepts as individual fields, to enhance readability. Optimizing the payload of a scenario may involve removing some scenario features intended for flexibility, ease of human reading, etc., in order to increase the efficiency of concurrency execution.

At 902, the optimizer 606 may in-line simple fields of the scenario. For example, higher order fields such as, for example, line, header, hostname, email, quote, etc. may be expressed as separate fields to help a human user understand the semantics of the scenario and its fields. In-lining the fields may involve replacing multiple fields with a simple string and/or string array. This may reduce the resources necessary to serialize and execute a concurrency of the scenario. For example, instead of having to separately parse each field, a serializer need only parse a single string and/or string array. For another example, an abstract syntax tree header, in one example embodiment, may comprise a sub-graph made up of a five nodes (i) a name of the header, (ii) a delimiter, e.g., a colon or ":"; (iii) a value; and (iv) a carriage return. For scale testing, it may not be necessary for each of these nodes to remain independent so, for example, the entirety of the header may be expressed as a string or byte array.

At 904, the optimizer 606 may identify static sub-trees. Static sub-trees may be nodes or sub-trees that do not include any options or variables to be utilized for scale testing. For example, static sub-trees may be expressed as separate nodes or sub-trees for use in other types of testing, such as mutation testing, where the goal is to generate large numbers of scenario variations. One example of a static sub-tree may be a tree that indicates a payload size. For example, a scenario may describe a flow for uploading multimedia files from a host to a server (e.g., digital images to an image printer). In this case, a static sub-tree may be a sub-tree describing a size of each multimedia file. Although in practice and, for example, in mutation testing, the size of each multimedia file may be varied, for scale testing, such variation may not be necessary and/or desired. Accordingly, the parser 606 may compute values for static sub-trees once for all concurrencies. The value may be expressed as a byte array and may replace the corresponding static sub-tree within the scenario. This may minimize the processor resources necessary to serialize and/or execute concurrencies of the scenario at run time. At 906, the optimizer 606 may merge contiguous static sub-trees. For example, if two or more static sub-trees are logically contiguous to one another, they may be expressed together as a single byte array. This may further reduce the resources necessary to serialize and/or execute concurrencies of the scenario.

At 908, the optimizer 606 may compute the total number of fields in the scenario and assign each field a unique identifier (e.g., a 0-based identifier). For example, when the scenario is serialized in preparation for the execution of one or more concurrencies of the scenario, the serializing functionality may utilize a hash table as it parses the scenario. Ordinarily, the size of, and therefore the amount of memory necessary for, the hash table is not known at the outset, leading to inefficient memory use. Pre-computing and labeling the fields of the scenario prior to serialization may increase the efficiency of and decrease the resources utilized by the serializing functionality.

At 910, the optimizer 606 may determine a last step of each transport object utilized by the scenario. For example, it will be appreciated that transport objects may be opened, but not closed (e.g., until a message flow is complete). This may lead to the inefficient use of sockets, ports and/or other transport objects. In one example scenario describing a multimedia download transaction, each user may open hundreds of sockets during the transaction, but may only use one at a time. When scaled up for a test simulating a large number of users (e.g., hundreds of thousands of users), the total number of sockets in use exceed the capabilities of the test engine and/or the device under test. By identifying the last step in which a transport object is utilized, the optimizer 606 may allow the runtime 610 executing a concurrency of the scenario to close a transport object upon completion, thus reducing the number of open transport objects.

The result of the parsing and optimizing (e.g., performed by the parser 604 and optimizer 606 and described by methods 700, 800 and 900) may be a processed scenario. In various example embodiments, the processed scenario may be partially or totally immutable. For example, the state of the scenario may not be changeable in a significant manner. It will be appreciated that some fields may still contain variables desirable and/or necessary for scale testing. The processed scenario may form a portion of a track, as described herein. The track may also comprise a pattern and a dataset. The dataset may comprise pre-computed values for the variables of the processed scenario, for example, as described above with respect to 808. The pattern may define a scale test to be executing utilizing the concurrency. For example, the pattern may specify one or more intervals of the test. Each interval may represent a period of time. The pattern may also specify, for each interval, a number of concurrencies of the scenario to be executed at the beginning of the interval and a number of concurrencies of the scenario to be executed at the end of the interval. The slope of the increase and/or decrease in concurrencies over an interval may be constant or, in various example embodiments, may be specified by the pattern.

Figure 10:
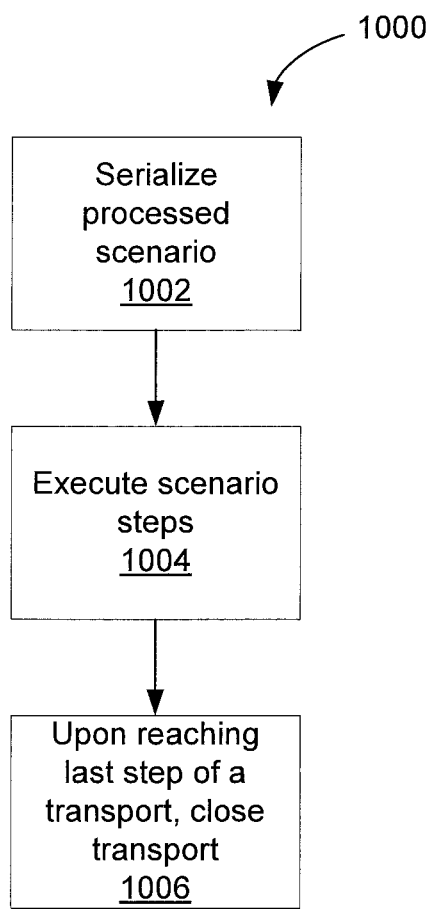
FIG. 10 is a flowchart of an example method for executing a concurrency of a scenario.

FIG. 10 is a flowchart of an example method 1000 for executing a concurrency of a scenario. The example method 1000 may be executed by a runtime 610. The runtime 610 may also execute other concurrencies of a common track and, in some example embodiments, may execute other all or a part of other tracks as well. At 1002, the runtime 610 may serialize the processed scenario. Serializing the processed scenario may comprise walking the abstract syntax tree and converting it to a serial format. For example, variables and/or options in the processed scenario may be assigned values, which may be randomly generated and/or pulled from a pre-computed dataset derived as described herein. Examples of variables to receive values may include, for example, addresses (e.g., IP or other network addresses) of the hosts or parties to the communication. In various example embodiments, serializing may also involve allocating system memory to one or more of the runtimes 610 as is required to execute the concurrencies. At 1004, the runtime 610 may execute steps (e.g., step objects) of the processed scenario. The steps may comprise, for example, sending and/or receiving messages according to the message flow or flows modeled by the processed scenario. At 1006, upon reaching the last step in which a transport object is utilized, the runtime 610 may terminate the transport (e.g., close a socket associated with the transport). The concurrency may conclude, for example, when all of the steps have been executed.

Figure 11:
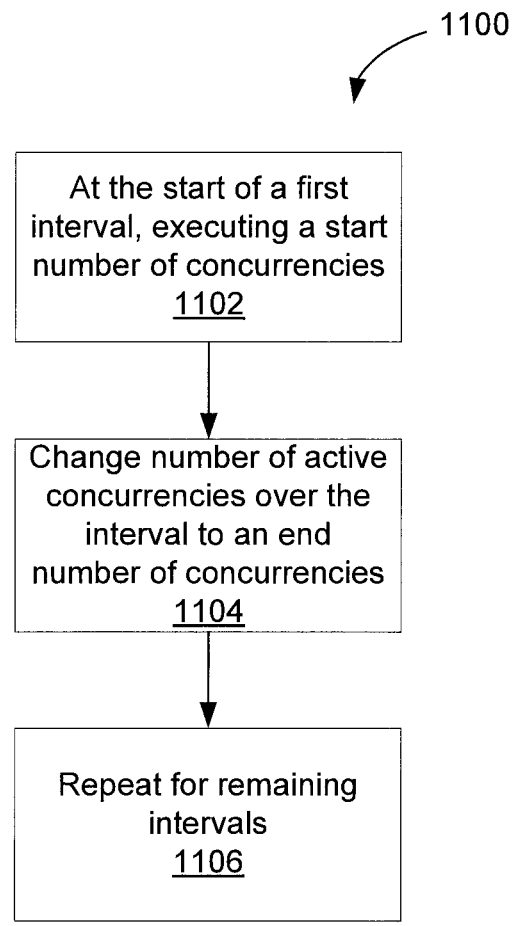
FIG. 11 is a flowchart of an example method for executing a track.

According to various example embodiments, concurrencies of the processed scenario may be executed in the form of a track, as described herein. FIG. 11 is a flowchart of an example method 1100 for executing a track according to a pattern. In example embodiments, a dataset may also be utilized. The example method 1100 may be executed by one or more runtimes 610. In various example embodiments, a single runtime 610 may execute the track, as described. In some cases, the single runtime 610 may also execute all or a portion of a different track. Also, in some example embodiments, multiple runtimes 610 may perform the example method 1100. For example, different runtimes may have responsibility for executing different concurrencies of the scenario (e.g., for example, as described with respect to FIG. 10). In various example embodiments, different runtimes may be programmed by different users, allowing differing levels of access to the scenario.

Referring to 1102, at the start of a first interval, for example, as defined by the pattern, the runtime 610 may execute a start number of concurrencies, according to the pattern. At 1104, the runtime 610 may change the number of active concurrencies over the interval to an end number of concurrencies at the end of the interval. The slope of the change in concurrencies may be constant (e.g., linear) or varied (e.g., non-linear), for example, defined by the pattern. At 1106, the runtime 610 may repeat 1102 and 1104 for the remaining intervals in the pattern. In various example embodiments, intervals may be continuous (e.g., the start number of concurrencies of an interval may be equal to the end number of concurrencies of the prior interval). In some example embodiments, however, intervals may be discontinuous. In some example embodiments, rather than specifying a number of concurrencies at the start and end of each interval, the pattern may specify a number of active connections, a bandwidth usage figure, etc.

According to various example embodiments, a scale test may involve the concurrent execution of one or more tracks, for example, as described above by example method 1100.

For example, different tracks may represent different types of communication scenarios that a device under test may have to handle under load. Each track may be executed by one or more runtimes 610. The runtimes 610 may be executed by a single system, or in some example embodiments, may be executed by a plurality of distributed systems. Example systems and methods for controlling distributed test engines, such as the scale test engine 602 and/or engines executing runtimes 610 as described are provided in commonly owned U.S. patent application Ser. No. 13/095,807 entitled, "A Scalable Control System for Test Execution and Monitoring Utilizing Multiple Processors," filed on Apr. 27, 2011.

Figure 12:
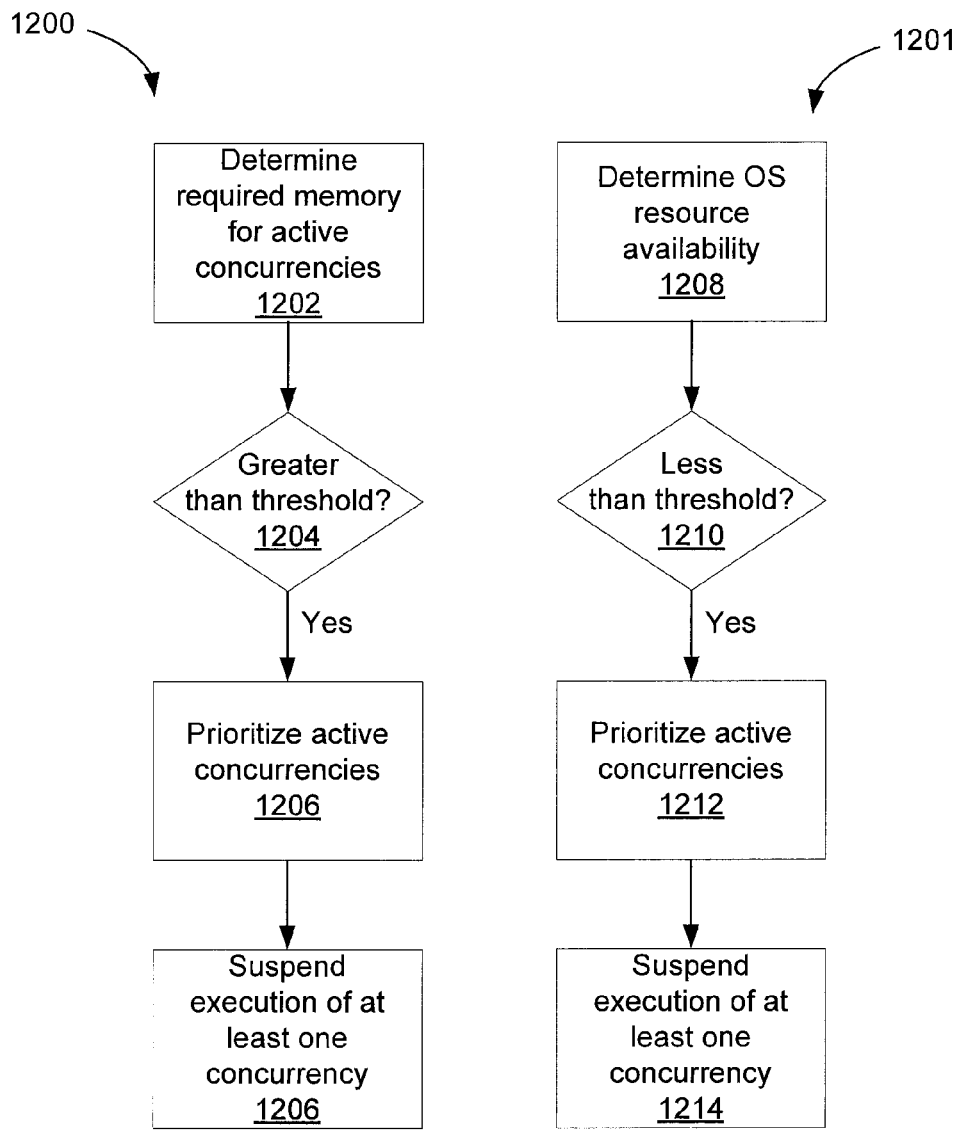
FIG. 12 is a flowchart showing two example methods for managing the execution of one or more tracks including multiple concurrencies.

According to various example embodiments, the scheduler 608 may be utilized to manage the execution of one or more tracks by one or more runtimes 610. For example, FIG. 12 is a flowchart showing two example methods 1200 and 1201 for managing the execution of one or more tracks including multiple concurrencies. The example methods 1200 and 1201 may be executed, for example, by the scheduler 608. The scheduler 608 may be a part of the scale test engine 602, for example, as illustrated by FIG. 6. In some example embodiments, the scheduler 608 may be implemented separately from the parser 604 and optimizer 606 (e.g., by a separate system). For example, in distributed testing environments, each distributed system executing one or more runtimes 610 may comprise scheduler functionality.

Example method 1200 may be implemented by the scheduler 608 to optimize memory usage during execution of one or more tracks. At 1202, the scheduler 608 may determine memory requirements for active concurrencies and/or concurrencies that will be activated in the near future (e.g., during the next interval). The memory requirement may be compared to a memory threshold at 1204. The memory threshold may represent a maximum amount of memory that the system will devote to execution of the concurrencies. The threshold may be set, for example, based on a maximum amount of memory available to the system, a maximum amount of memory available for the execution of scenario concurrencies, etc.

If the memory requirement exceeds the threshold at 1204, then the schedule 608 may prioritize the active concurrencies or, in the case where the scheduler 608 is forward-looking, concurrencies that will be active at a future time. At 1206, the scheduler 608 may suspend the execution of at least one concurrency. Suspending the execution of a concurrency may comprise suspending the execution of the runtime 610 executing the concurrency (e.g., if all of the concurrencies executed by the runtime 610 have been suspended) or instructing a runtime 610 to suspend one of the concurrencies under its management. The concurrency may be re-activated, for example, when the memory requirements on the system have lessened. In various example embodiments, more than one concurrency may be suspended at a time.

Example method 1201 may be implemented by the scheduler 608 to manage operating system resources during execution of one or more tracks. At 1208, the scheduler 608 may determine the availability of operating system (OS) resources. Examples of OS resources that may be managed include, for example, ports, sockets, etc. If the available OS resources are less than a threshold, then the scheduler may prioritize active concurrencies at 1212 and suspend at least one concurrency at 1214, for example, based on the prioritizing. The suspended concurrency may be reactivated, for example, when OS resource usage has lessened.

According to various example embodiments, the scheduler 608 may perform various other tasks for streamlining the execution of scale tests based on scenarios. For example, in various example embodiments, the scheduler 608 may provide event registration ant notification functionality. The runtime 610 implementing a concurrency may perform a dependent action (e.g., a first action that either cannot be completed or begun until another entity (e.g., the OS) performs a second action). For example, the first action may be an incomplete input/output (I/O) operation such as a connect, a partial read/write, or any other action that depends on another entity. Upon either readiness to proceed (e.g., completion of a preliminary action or of a prior action), the runtime 610 may register with the scheduler 608. When the OS, or other entity, completes the second action, the scheduler 608 may notify the appropriate runtime 610, allowing execution of the concurrency to proceed. In this way, the runtime 610 may not remain active and utilizing system resources while waiting for an operating system response. Any suitable service may be used to implement this functionality including, for example, kqueue, epoll, etc. For example, the scheduler 608 may select an optimal service mechanism based on the OS.

According to various example embodiments, the scheduler 608 may also implement an evented-input/output (evented I/O) process for managing tracks. For example, when all tracks to be executed by a system are loaded and the associated patterns initialized, the scheduler 608 may allow each concurrency to be executed (or its managing runtime 610) to execute the first step of the scenario. Alternatively (e.g., if memory or OS resources do not allow execution) the scheduler 608 may set a timer allowing the appropriate runtime 610 to execute a concurrency step after the timer has expired. Runtimes 610 managing concurrencies having dependent actions at the executed step may register with the scheduler 610, for example, as described above. The scheduler 608 may receive notifications from the OS when resources are available to perform the next phase of execution (e.g., the next scenario steps to be performed by the various concurrencies). At that point, the scheduler 608 may authorize one or more of the concurrencies (e.g., via their managing runtimes 610) to proceed. This cycle may continue until, for example, a user aborts the execution of the test or there are no more event registrations.

According to various example embodiments, multiple transport types may be supported by the scenarios described herein including, for example, UDP, TCP, SCTP, SSL, etc. The scale test engine 602 (e.g., the scheduler 608 and/or the runtimes 610) may contain various implementations of the transports that may, for example, operate over IPv4 or IPv6. Depending on the mode of execution (e.g., endpoint or passthrough), the transport steps (e.g., the runtime 610 managing a concurrency at a scenario transport step) may pick an appropriate transport type and delegate execution of the transport step to the transport type object. In various example embodiments, each of the IO objects may be implemented in non-blocking mode and may be designed to be reentrant and handle partial operations. In this way, a runtime 610 waiting to implement a step (e.g., an IO step) may not prevent other runtimes 610 from implementing other steps of other concurrencies.

In various example embodiments, the scale test engine 602 (e.g., the scheduler 608) may receive incoming messages and map the same to a runtime 610 managing a concurrency that should receive the messages. For example, a scenario may involve a communication between one or more clients (e.g., represented by the runtime 610) and a server (e.g., represented by the device under test). It will be appreciated that the scale test engine 602 may operate in a pass-through mode and/or in an end-point mode. In a pass-through mode, the device under test may be a pass-through device (e.g., a router, a firewall, etc.). The scenario steps may comprise one or more messages directed through the device under test in a semi-transparent manner. Examples of pass-through mode testing are provided in commonly owned U.S. patent application Ser. No. 11/351,402, entitled, "Analyzing the Security of Communication Protocol and Channels for a Pass-Through Device," filed on Feb. 10, 2006 and incorporated herein by reference in its entirety. In an end-point mode, the device under test may be an end-point device, such as a server. Scenario steps in end-point mode may comprise sending messages to one or more devices under test and, in various example embodiments, waiting for a reply from the server and sending additional messages premised on the reply. When operating in pass-through mode, the scale test engine 602 may assume that client and server connections are handled by the same runtime 610. In other embodiments, the test engine 602 may map incoming messages to a runtime 610 using a source address of the incoming communication (e.g., connection, packet, etc.) to map the same to the appropriate runtime 610.

In other example embodiments, the device under test may perform network address translation. In such cases the test engine 602 may implement regular expression-based filters to receive a translated address and generate an indication of the appropriate runtime 610. For example, the filters may be added by editing the underlying scenario or may be added automatically for some protocols (e.g., HTTP, SIP, etc.). The filter may be applied to an incoming data of a connection or packet. Results of the filter may be used as a search key that may be applied to a runtime map to determine the proper runtime. The filter key may be selected according to any suitable basis including, for example, considering:

1. Built-in session identification variables having unique values across all of the active variable instances;
2. Part of the outgoing date (e.g., responded to by the incoming data); and
3. A source-id, which may be an unexposed internal identifier of the client network object. The source-id may be of any suitable size or type, for example, it may be a 32-bit integer. If no filter is implemented, the test engine 602 may attempt to utilize features of the transport layer protocol (e.g., TCP options) to embed a source identification specifying the appropriate runtime into outgoing and, therefore, incoming communications.

A "communication protocol" refers to an exchange of data or messages in a known, structured format. Specifically, a protocol refers to what is being communicated (for example, the data or message content). Types of protocols include, for example, networking protocols (including network packets) and application-layer protocols (application program interfaces or "APIs", including API calls, remote method invocation (RMI), and remote procedure call (RPC)).

The implementation of a communication protocol may be tested using test cases. A test case generally includes one or more message exchanges between two or more entities (e.g., two devices or two processes). A test case (e.g., the messages that are exchanged) can be generated manually or automatically, as described in U.S. patent application Ser. No. 11/514,809, filed Sep. 1, 2006, entitled "Automated Generation of Attacks for Analyzing the Security of Communication Protocols and Channels" ("the '809 Application"), which is incorporated by reference herein in its entirety.

A protocol is generally defined by a specification. The specification can be expressed in a variety of formats, such as an Internet Engineering Task Force (IETF) Request for Comments (RFC), Web Services Description Language (WSDL), Backus-Naur Form (BNF), Augmented BNF (ABNF), regular expressions, Interface Definition Language (IDL), Document Type Definition (DTD), Management Information Base (MIB), eXtended Markup Language (XML) schema, eXternal Data Representation (XDR), and Abstract Syntax Notation 1 (ASN.1). The '809 Application describes software programs that parse machine-readable protocol specifications and generate test cases based on the specifications.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment. Reference to embodiments is intended to disclose examples, rather than limit the claimed invention.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method actions. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for scale testing a device under test, the method comprising:
   receiving, by a computer system, a scenario describing a model message exchange between at least a first host and a second host, wherein the computer system comprises at least one processor and operatively associated memory, wherein the scenario comprises a plurality of scenario objects, the plurality of scenario objects comprising:
      the first host and the second host;
      a plurality of transports utilized for the message exchange;
      a plurality of variables for the message exchange; and
      a plurality of steps for the message exchange; and
   receiving, by the computer system, a pattern associated with the scenario, wherein the pattern defines a plurality of intervals and, for each interval, a number of concurrencies at a start of the interval, and a number of concurrencies at an end of the interval;
   processing, by the computer system, the scenario to generate an processed scenario;
   executing, by the computer system, a first track, wherein executing the first track comprises executing a plurality of concurrencies of the processed scenario according to the pattern, wherein executing each of the plurality of concurrencies comprises:
      assigning at least one address to the first host and the second host;
      allocating at least one memory location to each of the plurality of variables; and
      executing the plurality of steps.

2. The method of claim 1, further comprising executing, by the computer system, the first host and the second host.

3. The method of claim 1, further comprising receiving a dataset, wherein the dataset comprises a plurality of values for the variable, and wherein executing each of the plurality of concurrencies further comprises assigning a value to each of the plurality of variables from the dataset.

4. The method of claim 1, wherein processing the scenario further comprises generating a dataset comprising a plurality of values for each of the plurality of variables, and wherein executing each of the plurality of concurrencies further comprises assigning a value to each of the plurality of variables from the dataset.

5. The method of claim 1, further comprising executing a second track, wherein executing the second track comprises executing a plurality of concurrencies of a second processed scenario according to a second pattern, wherein the second pattern defines a second plurality of intervals and, for each of the second plurality of intervals, a number of concurrencies at a start of the interval and a number of concurrencies at an end of the interval.

6. The method of claim 5, further comprising executing the first track and the second track asynchronously.

7. The method of claim 1, wherein processing the scenario to generate further comprising, prior to executing the first track:
   tallying a total number of the plurality of scenario objects; and
   indexing the plurality of scenario objects.

8. The method of claim 1, wherein the processing the scenario comprises converting the scenario to an abstract syntax tree.

9. The method of claim 8, wherein the processing the scenario comprises removing from the at least one variable at least one variable that is not used for the plurality of steps.

10. The method of claim 8, wherein processing the scenario comprises:
    identifying at least one static sub-tree of the abstract syntax tree; and
    replacing the at least one sub-tree with a byte array.

11. The method of claim 8, wherein processing the scenario comprises:
    identifying at least two contiguous static sub-trees of the abstract syntax tree;
    replacing the at least two contiguous static sub-trees with a byte array.

12. The method of claim 8, wherein processing the scenario comprises computing a number of fields in the abstract syntax tree.

13. The method of claim 1, wherein processing the scenario comprises identifying a last step selected from the plurality of steps for each of the plurality of transports.

14. The method of claim 13, wherein executing the first track further comprises closing a first transport selected from the plurality of transports upon execution of the identified last step of the first transport.

15. The method of claim 1, wherein the processed scenario is immutable.

16. The method of claim 1, wherein executing the plurality of concurrencies of the processed scenario according to the pattern comprises:
   executing, at the start of a first interval, the number of concurrencies at the start of the interval indicated by the pattern; and
   modifying the number of executed concurrencies during the interval such that the at the number of concurrencies executed at the end of the first interval is the number of concurrencies at the end of the interval indicated by the pattern.

17. The method of claim 1, wherein executing the first track comprises executing a runtime, wherein the runtime is configured to manage at least a portion of the plurality of concurrencies.

18. The method of claim 17, wherein a first step selected from the plurality of steps comprises a first action to be executed after a second action is executed by a component other than the runtime, and wherein executing the first step, by the runtime, comprises:
   registering with a scheduler executed by the computer system, wherein the registering indicates a readiness to execute the first action;
   receiving from the scheduler an indication that the second action has been executed;
   upon receiving the indication that the second action has been executed, executing the first action.

19. The method of claim 1, further comprising, for each interval, deriving the number of concurrencies at the start of the interval considering a desired number of active connections to the device under test at the start of the interval.

20. The method of claim 1, further comprising, for each interval, deriving the number of concurrencies at the start of the interval considering a desired bandwidth utilized by the device under test at the start of the interval.

21. A computer-implemented system, the system comprising at least one processor and operatively associated memory, wherein the at least one processor is programmed to implement a scale test engine configured to:
   receive a scenario describing a model message exchange between at least a first host and a second host, wherein the scenario comprises a plurality of scenario objects, the plurality of scenario objects comprising:
   the first host and the second host;
   a plurality of transports utilized for the message exchange;
   a plurality of variables for the message exchange; and
   a plurality of steps for the message exchange; and
   receive a pattern associated with the scenario, wherein the pattern defines a plurality of intervals and, for each interval, a number of concurrencies at a start of the interval, and a number of concurrencies at an end of the interval;
   process the scenario to generate an processed scenario;
   execute a first track, wherein executing the first track comprises executing a plurality of concurrencies of the processed scenario according to the pattern, wherein executing each of the plurality of concurrencies comprises:
   assigning at least one address to the first host and the second host;
   allocating at least one memory location to each of the plurality of variables; and
   executing the plurality of steps.

22. A computer-implemented method for scale testing a device under test, the method comprising:
   receiving, by a computer system, a first track, wherein the first track comprises a scenario and a pattern, wherein the computer system comprises at least one processor and operatively associated memory, wherein the pattern defines a plurality of intervals and, for each interval, a number of concurrencies at a start of the interval and a number of concurrencies at an end of the interval, and wherein the scenario comprises a plurality of scenario objects, the plurality of scenario objects comprising:
   a first host and a second host;
   a plurality of variables; and
   a plurality of steps, wherein at least a portion of the plurality of steps request an operating system resource; and
   executing, by the computer system, the first track, wherein executing the first track comprises executing a plurality of concurrencies of the scenario according to the pattern.

23. The method of claim 22, further comprising:
   determining a required memory allocation for execution of the plurality of concurrencies of the scenario according to the pattern at a first time; and
   when the required memory allocation for execution of the plurality of concurrencies of the scenario according to the pattern exceeds a threshold amount:
   prioritizing the plurality of concurrencies; and
   suspending the execution of at least one step from at least one concurrency of the scenario according to the prioritizing to bring the required memory allocation below the threshold.

24. The method of claim 22, further comprising:
   during execution of the first track, detecting a resource level of the operating system dropping below a threshold;
   when the resources level of the operating system drops below the threshold, suspending execution of a portion of the plurality of concurrencies; and
   upon completion of the non-suspended concurrencies, selecting at least one of the suspended concurrencies to re-activate.

25. The method of claim 22, wherein the second host is a device under test, further comprising:
   receiving an incoming message from the device under test as a result of a first step from the plurality of steps;
   identifying a concurrency corresponding to the first step based on at least one factor selected from the group consisting of a source address of the incoming message, a port associated with the incoming message, and a session ID variable identifying the concurrency.

26. The method of claim 22, further comprising executing, by the computer system, the first host and the second host.

27. The method of claim 22, wherein the plurality of scenario objects comprises a third host.

28. A computer-implemented system, the system comprising at least one processor and operatively associate memory, wherein the at least one processor is programmed to implement a scale test engine configured to:
   receive a first track, wherein the first track comprises a scenario and a pattern, wherein the pattern defines a plurality of intervals and, for each interval, a number of concurrencies at a start of the interval and a number of concurrencies at an end of the interval, and wherein the scenario comprises a plurality of scenario objects, the plurality of scenario objects comprising:

a first host and a second host;
a plurality of variables; and
a plurality of steps, wherein at least a portion of the plurality of steps request an operating system resource; and execute the first track, wherein executing the first track comprises executing a plurality of concurrencies of the scenario according to the pattern.

* * * * *